(12) United States Patent
Ardel et al.

(10) Patent No.: US 12,197,304 B2
(45) Date of Patent: Jan. 14, 2025

(54) ANOMALY DETECTION USING MULTIPLE DETECTION MODELS

(71) Applicant: SparkCognition, Inc., Austin, TX (US)

(72) Inventors: Alexandru Ardel, Austin, TX (US); Joshua Bronson, Austin, TX (US)

(73) Assignee: SPARKCOGNITION, INC., Austin, TX (US)

( * ) Notice: Subject to any disclaimer, the term of this patent is extended or adjusted under 35 U.S.C. 154(b) by 0 days.

(21) Appl. No.: 17/658,184

(22) Filed: Apr. 6, 2022

(65) Prior Publication Data

US 2023/0325292 A1 Oct. 12, 2023

(51) Int. Cl.
| | |
|---|---|
| G06F 11/30 | (2006.01) |
| G05B 23/02 | (2006.01) |
| G06F 11/32 | (2006.01) |
| G06N 3/088 | (2023.01) |

(52) U.S. Cl.
CPC ...... G06F 11/3058 (2013.01); G05B 23/0254 (2013.01); G06F 11/327 (2013.01); G06N 3/088 (2013.01); G05B 23/0275 (2013.01)

(58) Field of Classification Search
CPC ... G06F 11/3058; G06F 11/327; G06N 3/088; G05B 23/0205; G05B 23/0243; G05B 23/0254; G05B 23/0259; G05B 23/0275
See application file for complete search history.

(56) References Cited

U.S. PATENT DOCUMENTS

| | | | |
|---|---|---|---|
| 9,785,495 B1 | 10/2017 | Lazier et al. | |
| 10,594,710 B2 | 3/2020 | Wright et al. | |
| 10,749,881 B2 | 8/2020 | Tauschinsky et al. | |
| 10,776,196 B2 | 9/2020 | Ohana et al. | |
| 10,867,250 B2 | 12/2020 | Srinivasan et al. | |
| 10,885,239 B2 | 1/2021 | Bak et al. | |
| 10,909,322 B1 | 2/2021 | Seow et al. | |
| 10,956,808 B1 | 3/2021 | Bhardwaj et al. | |
| 11,227,236 B2 | 1/2022 | Ardel et al. | |
| 2015/0127595 A1 | 5/2015 | Hawkins et al. | |
| 2020/0023846 A1 | 1/2020 | Husain et al. | |
| 2020/0134510 A1 | 4/2020 | Basel et al. | |
| 2020/0165995 A1 | 5/2020 | Moeckly et al. | |
| 2020/0292608 A1 | 9/2020 | Yan et al. | |
| 2020/0333777 A1 | 10/2020 | Maruyama | |
| 2020/0379454 A1 | 12/2020 | Trinh et al. | |
| 2021/0209476 A1 | 7/2021 | Andoni et al. | |
| 2021/0326741 A1 | 10/2021 | Ardel et al. | |
| 2021/0326759 A1 | 10/2021 | Ardel et al. | |
| 2022/0011764 A1* | 1/2022 | Funabashi | G05B 23/024 |

(Continued)

OTHER PUBLICATIONS

Jhonatan, Robust Structural Damage Detection by Using Statistical Hybrid Algorithms, (Year: 2019).

*Primary Examiner* — Manuel L Barbee

(74) *Attorney, Agent, or Firm* — Moore IP Law

(57) ABSTRACT

A method of monitoring behavior of a device includes obtaining, at a computing device, first data based on first sensor data from a first sensor device coupled to the device. The method includes processing, at the computing device, the first data at a first anomaly detection model and at a second anomaly detection model of multiple anomaly detection models trained to detect anomalous behavior of the device. The method also includes determining, based on outputs of the multiple anomaly detection models, whether to generate an alert.

20 Claims, 9 Drawing Sheets

(56) References Cited

U.S. PATENT DOCUMENTS

| | | | |
|---|---|---|---|
| 2022/0099532 A1* | 3/2022 | Zhang | G05B 23/0221 |
| 2023/0068908 A1* | 3/2023 | Guo | G05B 23/024 |
| 2023/0078208 A1* | 3/2023 | Egboga | G06N 5/04 |
| 2023/0131992 A1* | 4/2023 | Shah | F03D 17/011 |
| | | | 416/1 |

* cited by examiner

ANOMALY DETECTION USING MULTIPLE DETECTION MODELS

FIELD

The present disclosure is generally related to using trained models to detect anomalous behavior.

BACKGROUND

Abnormal behavior can be detected using rules established by a subject matter expert or derived from physics-based models. However, it can be expensive and time consuming to properly establish and confirm such rules. The time and expense involved is compounded if the equipment or process being monitored has several normal operational states or if what behavior is considered normal changes from time to time.

Abnormal behavior detection can be implemented using machine learning, such as by training an anomaly detection model to detect anomalous behavior of a system based on inputs representing measurements of various aspects of the system. In general, anomaly detection modelling of complex systems may use a large number of such inputs to provide comprehensive data to an anomaly detection model regarding operation of various aspects of the system. However, using a large number of inputs to model a complex system also introduces various challenges.

For example, in complex systems in which some properties of the system are controlled by a control system, measurements of the controlled properties of the system may show less fluctuation than measurements of other properties of the system that are not controlled by a control system. An anomaly detection model attempting to detect anomalous behavior based on a large set of inputs tends to focus on the larger fluctuations of the uncontrolled system properties and to largely ignore the smaller fluctuations of the controlled system properties, even though relatively small variations in the controlled system properties can also be indicative of abnormal behavior. As another example, as the number of inputs to an anomaly detection model is increased, the ability of the anomaly detection model to detect relatively brief anomalous events tends to be reduced. Overall accuracy of anomaly detection modeling would be improved by the reduction or mitigation of such effects when processing large sets of inputs.

SUMMARY

The present disclosure describes systems and methods that enable use of trained machine learning models to detect anomalous behavior of monitored devices, systems, or processes. Such monitored devices, systems, or processes are collectively referred to herein as "assets" for ease of reference. In some implementations, the models are automatically generated and trained based on historic data.

In some aspects, a method of monitoring behavior of a device includes obtaining, at a computing device, first data based on first sensor data from a first sensor device coupled to the device. The method includes processing, at the computing device, the first data at a first anomaly detection model and at a second anomaly detection model of multiple anomaly detection models trained to detect anomalous behavior of the device. The method also includes determining, based on outputs of the multiple anomaly detection models, whether to generate an alert.

In some aspects, a computing device includes one or more processors configured to obtain first data based on first sensor data from a first sensor device coupled to a device. The one or more processors are configured to process the first data at a first anomaly detection model and at a second anomaly detection model of multiple anomaly detection models trained to detect anomalous behavior of the device. The one or more processors are also configured to determine, based on outputs of the multiple anomaly detection models, whether to generate an alert.

In some aspects, a computer-readable storage device stores instructions. The instructions, when executed by one or more processors, cause the one or more processors to obtain first data based on first sensor data from a first sensor device coupled to a device. The instructions also cause the one or more processors to process the first data at a first anomaly detection model and at a second anomaly detection model of multiple anomaly detection models trained to detect anomalous behavior of the device. The instructions further cause the one or more processors to determine, based on outputs of the multiple anomaly detection models, whether to generate an alert.

DETAILED DESCRIPTION

Figure 1:
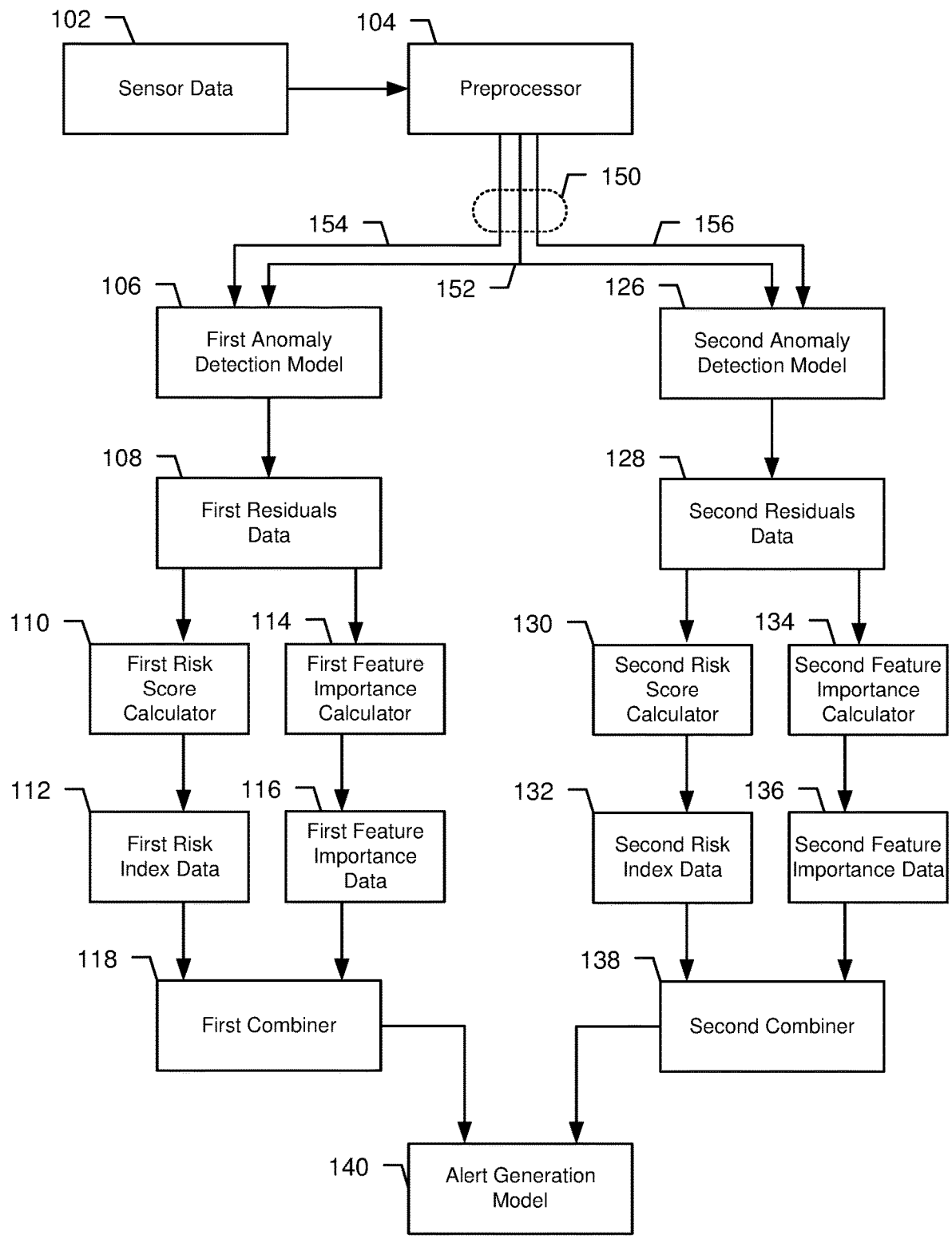
FIG. 1 is a diagram illustrating particular aspects of operations to detect anomalous behavior of a monitored asset using multiple anomaly detection models in accordance with some examples of the present disclosure.

Systems and methods of anomaly detection using multiple detection models are disclosed. Although the accuracy of an anomaly detection model trained to detect anomalous behavior of a complex system can be generally improved by increasing the number of inputs representing measurements of various aspects of the system, increasing the number of inputs can also introduce suboptimal effects, such as by reducing the model's focus on controlled aspects of the system that have relatively low amounts of fluctuation, and reducing the model's sensitivity for detecting relatively brief anomalous events. In the disclosed systems and methods, instead of using a global anomaly detection model to monitor operation of a system, multiple smaller anomaly detection models are used. Such smaller models enable various components or systems of the overall system to be separately monitored by anomaly detection models that can be independently trained for each component or system. By using multiple anomaly detection models, the above-identified drawbacks of using a global anomaly detection system can be reduced or otherwise mitigated, enabling higher accuracy detection of anomalous behavior of a monitored asset as compared to the use of a global anomaly detection model.

According to some aspects, each of a first set of multiple anomaly detection models monitors a different domain of a monitored asset. In an illustrative, non-limiting example in which the monitored asset is a gas turbine engine, a first anomaly detection model monitors a thermodynamic domain (e.g., pressures, temperatures, flows, etc.) of the monitored asset, and a second anomaly detection model monitors a mechanical domain (e.g., vibration, displacement, etc.) of the monitored asset. According to some aspects, each of a second set of the multiple anomaly detection models monitors different components of a monitored asset. Continuing the above example, a third anomaly detection model may monitor operation of a compressor of the monitored asset, and a fourth anomaly detection model may monitor operation of a turbine of the monitored asset, as illustrative, non-limiting examples.

Selection of such domains and components to be monitored with separate anomaly detection models may be based on, or informed by, expertise or other knowledge regarding the design and processes of the monitored asset. For example, a monitored asset may include machinery with multiple modules including a compressor, a turbine, a lubrication system, etc. Anomaly detection models can be selected to monitor particular domains and components based on the modular design of the system and the various domains, such as thermodynamic aspects, mechanical aspects, electrochemical aspects, etc., of the machinery. Thus, the selection and design of the models may be informed by first principles and subject matter expertise regarding the components, systems, and physical processes (e.g., physics-based modeling) occurring in the monitored asset.

According to a particular aspect, separately monitored domains or components of the monitored asset exhibit at least some overlap with regard to one or more aspects of operation. For example, temperature measurements from a temperature sensor coupled to a combustor of the monitored asset may be pertinent to a thermodynamic domain model for the monitored asset and may also be pertinent to a combustor operation model. Thus, the temperature measurements from the temperature sensor can be provided as input to a first anomaly detection model that detects anomalous behavior of the thermodynamic domain and also provided as input to a second anomaly detection model that detects anomalous operation of the combustor. Such inputs that are provided to two or more anomaly detection models may be referred to as "common" or "shared" inputs. Using common inputs across multiple anomaly detection models links the overlapping domains and components of the underlying asset and helps preserve consistency and accuracy across the different domain models.

In some implementations, one or more of the anomaly detection models that receives a common input is configured to cast the common input (e.g., the temperature) into a different form prior to using the input. For example, a first anomaly detection model for the thermodynamic domain may cast temperature measurements into a form of $1/\sqrt{T}$ (T)—i.e., an inverse square root of temperature—based on a physics model that relates the inverse square root of temperature to pressure, while a second anomaly detection model may input the temperature measurements as-is, or with scaling, normalization, etc.

Outputs of the multiple anomaly detection models are joined to generate an overall output for the asset being monitored. According to some aspects, each of the multiple anomaly detection models selectively generates its own alert in response to detection of anomalous behavior in the particular domain or component being monitored by that anomaly detection model. Such alerts can be combined, such as via a logical operation, alert aggregation model, or classifier, to generate an overall alert for the monitored asset.

The use of multiple anomaly detection models to monitor multiple domains of the monitored asset enables simplified model training because each of the multiple anomaly detection models operates on a reduced number of inputs as compared to using a global model for the monitored asset. To illustrate, during training of a global model, most of the various inputs are irrelevant to event detection but still affect loss variables. Using separate anomaly detection models also enables the various models to be trained for specific domains or components, so that an anomaly detection model for a controlled domain, such as a controlled thermodynamic domain, can be trained based on the relatively small fluctuations in inputs from the controlled domain without being affected by relatively large fluctuations in inputs from a non-controlled domain (or from a domain controlled by a different control system). As a result, overall accuracy of anomaly detection in the monitored asset is enhanced.

Because each of the separate anomaly detection models is smaller than a global anomaly detection model, the ability to detect relatively brief events occurring during operation of the monitored asset may be enhanced without reducing the ability to detect longer-lasting events. In addition, using separate anomaly detection models based on individual components improves modularity, so that when a component of the monitored asset is replaced or altered, a relatively small number of anomaly detection models—e.g., the one or more anomaly detection models related to that component—can be retrained or replaced, without having to retrain a global anomaly detection model for the entire monitored asset.

The systems and methods disclosed herein thus enable improved monitoring of assets to detect anomalous behavior. For example, the anomalous behavior may be indicative of an impending failure of the asset, and the systems and methods disclosed herein may facilitate prediction of the impending failure so that maintenance or other actions can be taken. Combining or aggregating alerts generated from separate anomaly detection models reduces complexity associated with providing various alerts from the separate anomaly detection models to an operator of the system. In addition, inclusion of information regarding an origin of each of the various alerts enables the operator to be informed of which anomaly detection model originated an alert and may improve the operator's speed and accuracy in responding to the alert. As a result, cost and delay associated with triaging the alert is reduced, and an operational life of the monitored asset can be extended due to more timely and accurate remedial actions taken in response to detecting abnormal behavior.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further the terms "comprise," "comprises," and "comprising" may be used interchangeably with "include," "includes," or "including." Additionally, the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. Such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled" (e.g., capable of communication via one or more communication media), "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, the term "machine learning" should be understood to have any of its usual and customary meanings within the fields of computers science and data science, such meanings including, for example, processes or techniques by which one or more computers can learn to perform some operation or function without being explicitly programmed to do so. As a typical example, machine learning can be used to enable one or more computers to analyze data to identify patterns in data and generate a result based on the analysis. For certain types of machine learning, the results that are generated include data that indicates an underlying structure or pattern of the data itself. Such techniques, for example, include so called "clustering" techniques, which identify clusters (e.g., groupings of data elements of the data).

For certain types of machine learning, the results that are generated include a data model (also referred to as a "machine-learning model" or simply a "model"). Typically, a model is generated using a first data set to facilitate analysis of a second data set. For example, a first portion of a large body of data may be used to generate a model that can be used to analyze the remaining portion of the large body of data. As another example, a set of historical data can be used to generate a model that can be used to analyze future data.

Since a model can be used to evaluate a set of data that is distinct from the data used to generate the model, the model can be viewed as a type of software (e.g., instructions, parameters, or both) that is automatically generated by the computer(s) during the machine learning process. As such, the model can be portable (e.g., can be generated at a first computer, and subsequently moved to a second computer for further training, for use, or both). Additionally, a model can be used in combination with one or more other models to perform a desired analysis. To illustrate, first data can be provided as input to a first model to generate first model output data, which can be provided (alone, with the first data, or with other data) as input to a second model to generate second model output data indicating a result of a desired analysis. Depending on the analysis and data involved, different combinations of models may be used to generate such results. In some examples, multiple models may provide model output that is input to a single model. In some examples, a single model provides model output to multiple models as input.

Examples of machine-learning models include, without limitation, perceptrons, neural networks, support vector machines, regression models, decision trees, Bayesian models, Boltzmann machines, adaptive neuro-fuzzy inference systems, as well as combinations, ensembles and variants of these and other types of models. Variants of neural networks include, for example and without limitation, prototypical networks, autoencoders, transformers, self-attention networks, convolutional neural networks, deep neural networks, deep belief networks, etc. Variants of decision trees include, for example and without limitation, random forests, boosted decision trees, etc.

Since machine-learning models are generated by computer(s) based on input data, machine-learning models can be discussed in terms of at least two distinct time windows—a creation/training phase and a runtime phase. During the creation/training phase, a model is created, trained, adapted, validated, or otherwise configured by the computer based on the input data (which in the creation/training phase, is generally referred to as "training data"). Note that the trained model corresponds to software that has been generated and/or refined during the creation/training phase to perform particular operations, such as classification, prediction, encoding, or other data analysis or data synthesis operations. During the runtime phase (or "inference" phase), the model is used to analyze input data to generate model output. The content of the model output depends on the type of model. For example, a model can be trained to perform classification tasks or regression tasks, as non-limiting examples. In some implementations, a model may be continuously, periodically, or occasionally updated, in which case training time and runtime may be interleaved or one version of the model can be used for inference while a copy is updated, after which the updated copy may be deployed for inference.

In some implementations, a previously generated model is trained (or re-trained) using a machine-learning technique. In this context, "training" refers to adapting the model or parameters of the model to a particular data set. Unless otherwise clear from the specific context, the term "training" as used herein includes "re-training" or refining a model for a specific data set. For example, training may include so called "transfer learning." As described further below, in transfer learning a base model may be trained using a generic or typical data set, and the base model may be subsequently refined (e.g., re-trained or further trained) using a more specific data set.

A data set used during training is referred to as a "training data set" or simply "training data." The data set may be labeled or unlabeled. "Labeled data" refers to data that has been assigned a categorical label indicating a group or category with which the data is associated, and "unlabeled data" refers to data that is not labeled. Typically, "supervised machine-learning processes" use labeled data to train a machine-learning model, and "unsupervised machine-learning processes" use unlabeled data to train a machine-learning model; however, it should be understood that a label associated with data is itself merely another data element that can be used in any appropriate machine-learning process. To illustrate, many clustering operations can operate using unlabeled data; however, such a clustering operation can use labeled data by ignoring labels assigned to data or by treating the labels the same as other data elements.

Machine-learning models can be initialized from scratch (e.g., by a user, such as a data scientist) or using a guided process (e.g., using a template or previously built model). Initializing the model includes specifying parameters and hyperparameters of the model. "Hyperparameters" are characteristics of a model that are not modified during training, and "parameters" of the model are characteristics of the model that are modified during training. The term "hyperparameters" may also be used to refer to parameters of the training process itself, such as a learning rate of the training process. In some examples, the hyperparameters of the model are specified based on the task the model is being created for, such as the type of data the model is to use, the goal of the model (e.g., classification, regression, anomaly detection), etc. The hyperparameters may also be specified based on other design goals associated with the model, such as a memory footprint limit, where and when the model is to be used, etc.

Model type and model architecture of a model illustrate a distinction between model generation and model training. The model type of a model, the model architecture of the model, or both, can be specified by a user or can be automatically determined by a computing device. However, neither the model type nor the model architecture of a particular model is changed during training of the particular model. Thus, the model type and model architecture are hyperparameters of the model and specifying the model type and model architecture is an aspect of model generation (rather than an aspect of model training). In this context, a "model type" refers to the specific type or sub-type of the machine-learning model. As noted above, examples of machine-learning model types include, without limitation, perceptrons, neural networks, support vector machines, regression models, decision trees, Bayesian models, Boltzmann machines, adaptive neuro-fuzzy inference systems, as well as combinations, ensembles and variants of these and other types of models. In this context, "model architecture" (or simply "architecture") refers to the number and arrangement of model components, such as nodes or layers, of a model, and which model components provide data to or receive data from other model components.

As a non-limiting example, the architecture of a neural network may be specified in terms of nodes and links. To illustrate, a neural network architecture may specify the number of nodes in an input layer of the neural network, the number of hidden layers of the neural network, the number of nodes in each hidden layer, the number of nodes of an output layer, and which nodes are connected to other nodes (e.g., to provide input or receive output). As another non-limiting example, the architecture of a neural network may be specified in terms of layers. To illustrate, the neural network architecture may specify the number and arrangement of specific types of functional layers, such as long-short-term memory (LSTM) layers, fully connected (FC) layers, convolution layers, etc. While the architecture of a neural network implicitly or explicitly describes links between nodes or layers, the architecture does not specify link weights. Rather, link weights are parameters of a model (rather than hyperparameters of the model) and are modified during training of the model.

In many implementations, a data scientist selects the model type before training begins. However, in some implementations, a user may specify one or more goals (e.g., classification or regression), and automated tools may select one or more model types that are compatible with the specified goal(s). In such implementations, more than one model type may be selected, and one or more models of each selected model type can be generated and trained. A best performing model (based on specified criteria) can be selected from among the models representing the various model types. Note that in this process, no particular model type is specified in advance by the user, yet the models are trained according to their respective model types. Thus, the model type of any particular model does not change during training.

Similarly, in some implementations, the model architecture is specified in advance (e.g., by a data scientist); whereas in other implementations, a process that both generates and trains a model is used. Generating (or generating and training) the model using one or more machine-learning techniques is referred to herein as "automated model building." In one example of automated model building, an initial set of candidate models is selected or generated, and then one or more of the candidate models are trained and evaluated. In some implementations, after one or more rounds of changing hyperparameters and/or parameters of the candidate model(s), one or more of the candidate models may be selected for deployment (e.g., for use in a runtime phase).

Certain aspects of an automated model building process may be defined in advance (e.g., based on user settings, default values, or heuristic analysis of a training data set) and other aspects of the automated model building process may be determined using a randomized process. For example, the architectures of one or more models of the initial set of models can be determined randomly within predefined limits. As another example, a termination condition may be specified by the user or based on configurations settings. The termination condition indicates when the automated model building process should stop. To illustrate, a termination condition may indicate a maximum number of iterations of the automated model building process, in which case the automated model building process stops when an iteration counter reaches a specified value. As another illustrative example, a termination condition may indicate that the automated model building process should stop when a reliability metric associated with a particular model satisfies a threshold. As yet another illustrative example, a termination condition may indicate that the automated model building process should stop if a metric that indicates improvement of one or more models over time (e.g., between iterations) satisfies a threshold. In some implementations, multiple termination conditions, such as an iteration count condition, a time limit condition, and a rate of improvement condition can be specified, and the automated model building process can stop when one or more of these conditions is satisfied.

Another example of training a previously generated model is transfer learning. "Transfer learning" refers to initializing a model for a particular data set using a model that was trained using a different data set. For example, a "general purpose" model can be trained to detect anomalies in vibration data associated with a variety of types of rotary equipment, and the general-purpose model can be used as the starting point to train a model for one or more specific types of rotary equipment, such as a first model for generators and a second model for pumps. As another example, a general-purpose natural-language processing model can be trained using a large selection of natural-language text in one or more target languages. In this example, the general-purpose natural-language processing model can be used as a starting point to train one or more models for specific natural-language processing tasks, such as translation between two languages, question answering, or classifying the subject matter of documents. Often, transfer learning can converge to a useful model more quickly than building and training the model from scratch.

Training a model based on a training data set generally involves changing parameters of the model with a goal of causing the output of the model to have particular characteristics based on data input to the model. To distinguish from model generation operations, model training may be referred to herein as optimization or optimization training. In this context, "optimization" refers to improving a metric, and does not mean finding an ideal (e.g., global maximum or global minimum) value of the metric. Examples of optimization trainers include, without limitation, backpropagation trainers, derivative free optimizers (DFOs), and extreme learning machines (ELMs). As one example of training a model, during supervised training of a neural network, an input data sample is associated with a label. When the input data sample is provided to the model, the model generates output data, which is compared to the label associated with the input data sample to generate an error value. Parameters of the model are modified in an attempt to reduce (e.g., optimize) the error value. As another example of training a model, during unsupervised training of an autoencoder, a data sample is provided as input to the autoencoder, and the autoencoder reduces the dimensionality of the data sample (which is a lossy operation) and attempts to reconstruct the data sample as output data. In this example, the output data is compared to the input data sample to generate a reconstruction loss, and parameters of the autoencoder are modified in an attempt to reduce (e.g., optimize) the reconstruction loss.

As another example, to use supervised training to train a model to perform a classification task, each data element of a training data set may be labeled to indicate a category or categories to which the data element belongs. In this example, during the creation/training phase, data elements are input to the model being trained, and the model generates output indicating categories to which the model assigns the data elements. The category labels associated with the data elements are compared to the categories assigned by the model. The computer modifies the model until the model accurately and reliably (e.g., within some specified criteria) assigns the correct labels to the data elements. In this example, the model can subsequently be used (in a runtime phase) to receive unknown (e.g., unlabeled) data elements, and assign labels to the unknown data elements. In an unsupervised training scenario, the labels may be omitted. During the creation/training phase, model parameters may be tuned by the training algorithm in use such that the during the runtime phase, the model is configured to determine which of multiple unlabeled "clusters" an input data sample is most likely to belong to.

As another example, to train a model to perform a regression task, during the creation/training phase, one or more data elements of the training data are input to the model being trained, and the model generates output indicating a predicted value of one or more other data elements of the training data. The predicted values of the training data are compared to corresponding actual values of the training data, and the computer modifies the model until the model accurately and reliably (e.g., within some specified criteria) predicts values of the training data. In this example, the model can subsequently be used (in a runtime phase) to receive data elements and predict values that have not been received. To illustrate, the model can analyze time series data, in which case, the model can predict one or more future values of the time series based on one or more prior values of the time series.

In some aspects, the output of a model can be subjected to further analysis operations to generate a desired result. To illustrate, in response to particular input data, a classification model (e.g., a model trained to perform classification tasks) may generate output including an array of classification scores, such as one score per classification category that the model is trained to assign. Each score is indicative of a likelihood (based on the model's analysis) that the particular input data should be assigned to the respective category. In this illustrative example, the output of the model may be subjected to a softmax operation to convert the output to a probability distribution indicating, for each category label, a probability that the input data should be assigned the corresponding label. In some implementations, the probability distribution may be further processed to generate a one-hot encoded array. In other examples, other operations that retain one or more category labels and a likelihood value associated with each of the one or more category labels can be used.

One example of a machine-learning model is an autoencoder. An autoencoder is a particular type of neural network that is trained to receive multivariate input data, to process at least a subset of the multivariate input data via one or more hidden layers, and to perform operations to reconstruct the multivariate input data using output of the hidden layers. If at least one hidden layer of an autoencoder includes fewer nodes than the input layer of the autoencoder, the autoencoder may be referred to herein as a dimensional reduction model. If each of the one or more hidden layer(s) of the autoencoder includes more nodes than the input layer of the autoencoder, the autoencoder may be referred to herein as a denoising model or a sparse model, as explained further below.

For dimensional reduction type autoencoders, the hidden layer with the fewest nodes is referred to as the latent space layer. Thus, a dimensional reduction autoencoder is trained to receive multivariate input data, to perform operations to dimensionally reduce the multivariate input data to generate latent space data in the latent space layer, and to perform operations to reconstruct the multivariate input data using the latent space data. "Dimensional reduction" in this context refers to representing n values of multivariate input data using z values (e.g., as latent space data), where n and z are integers and z is less than n. Often, in an autoencoder the z values of the latent space data are then dimensionally expanded to generate n values of output data. In some special cases, a dimensional reduction model may generate m values of output data, where m is an integer that is not equal to n. As used herein, such special cases are still referred to as autoencoders as long as the data values represented by the input data are a subset of the data values represented by the output data or the data values represented by the output data are a subset of the data values represented by the input data. For example, if the multivariate input data includes 10 sensor data values from 10 sensors, and the dimensional reduction model is trained to generate output data representing only 5 sensor data values corresponding to 5 of the 10 sensors, then the dimensional reduction model is referred to herein as an autoencoder. As another example, if the multivariate input data includes 10 sensor data values from 10 sensors, and the dimensional reduction model is trained to generate output data representing 10 sensor data values corresponding to the 10 sensors and to generate a variance value (or other statistical metric) for each of the sensor data values, then the dimensional reduction model is also referred to herein as an autoencoder (e.g., a variational autoencoder).

Denoising autoencoders and sparse autoencoders do not include a latent space layer to force changes in the input data. An autoencoder without a latent space layer could simply pass the input data, unchanged, to the output nodes resulting in a model with little utility. Denoising autoencoders avoid this result by zeroing out a subset of values of an input data set while training the denoising autoencoder to reproduce the entire input data set at the output nodes. Put another way, the denoising autoencoder is trained to reproduce an entire input data sample based on input data that includes less than the entire input data sample. For example, during training of a denoising autoencoder that includes 10 nodes in the input layer and 10 nodes in the output layer, a single set of input data values includes 10 data values; however, only a subset of the 10 data values (e.g., between 2 and 9 data values) are provided to the input layer. The remaining data values are zeroed out. To illustrate, out of 10 data values, 7 data values may be provided to a respective 7 nodes of the input layer, and zero values may be provided to the other 3 nodes of the input layer. Fitness of the denoising autoencoder is evaluated based on how well the output layer reproduces all 10 data values of the set of input data values, and during training, parameters of the denoising autoencoder are modified over multiple iterations to improve its fitness.

Sparse autoencoders prevent passing the input data unchanged to the output nodes by selectively activating a subset of nodes of one or more of the hidden layers of the sparse autoencoder. For example, if a particular hidden layer has 10 nodes, only 3 nodes may be activated for particular data. The sparse autoencoder is trained such that which nodes are activated is data dependent. For example, for a first data sample, 3 nodes of the particular hidden layer may be activated, whereas for a second data sample, 5 nodes of the particular hidden layer may be activated.

One use case for autoencoders is detecting significant changes in data. For example, an autoencoder can be trained using training sensor data gathered while a monitored system is operating in a first operational mode. In this example, after the autoencoder is trained, real-time sensor data from the monitored system can be provided as input data to the autoencoder. If the real-time sensor data is sufficiently similar to the training sensor data, then the output of the autoencoder should be similar to the input data. Illustrated mathematically:

$$\widehat{x_k} - x_k \approx 0$$

where $\widehat{x_k}$ represents an output data value k and $x_k$ represents the input data value k. If the output of the autoencoder exactly reproduces the input, then $\widehat{x_k} - x_k = 0$ for each data value k. However, it is generally the case that the output of a well-trained autoencoder is not identical to the input. In such cases, $\widehat{x_k} - x_k = r_k$, where $r_k$ represents a residual value. Residual values that result when particular input data is provided to the autoencoder can be used to determine whether the input data is similar to training data used to train the autoencoder. For example, when the input data is similar to the training data, relatively low-magnitude residual values should result. In contrast, when the input data is not similar to the training data, relatively high-magnitude residual values should result. During runtime operation, residual values calculated based on output of the autoencoder can be used to determine the likelihood or risk that the input data differs significantly from the training data.

As one particular example, the input data can include multivariate sensor data representing operation of a monitored system. In this example, the autoencoder can be trained using training data gathered while the monitored system was operating in a first operational mode (e.g., a normal mode or some other mode). During use, real-time sensor data from the monitored system can be input to the autoencoder, and residual values can be determined based on differences between the real-time sensor data and output data from the autoencoder. If the monitored system transitions to a second operational mode (e.g., an abnormal mode, a second normal mode, or some other mode) statistical properties of the residual values (e.g., the mean or variance of the residual values over time) will change. Detection of such changes in the residual values can provide an early indication of changes associated with the monitored system. To illustrate, one use of the example above is early detection of abnormal operation of the monitored system. In this use case, the training data includes a variety of data samples representing one or more "normal" operating modes. During runtime, the input data to the autoencoder represents the current (e.g., real-time) sensor data values, and the residual values generated during runtime are used to detect early onset of an abnormal operating mode. In other use cases, autoencoders can be trained and used to detect changes between two or more different normal operating modes (in addition to, or instead of, detecting onset of abnormal operating modes).

FIG. 1 is a diagram illustrating particular aspects of operations to detect anomalous behavior of a monitored asset using multiple anomaly detection models in accordance with some examples of the present disclosure. The operations illustrated in FIG. 1 are performed by one or more processors, such as processor(s) of one or more server or cloud-based computing systems, one or more control systems, one or more desktop or laptop computers, one or more internet of things devices, etc. Data used by and generated by various of the operations are also illustrated in FIG. 1.

In FIG. 1, sensor data 102 is received and preprocessed at a preprocessor 104. The sensor data 102 includes raw time-series data, windowed or sampled time-series data, or other data representative of operation of one or more monitored assets. Non-limiting examples of the sensor data include a time series of temperature measurement values, a time series of vibration measurement values, a time series of voltage measurement values, a time series of amperage measurement values, a time series of rotation rate measurement values, a time series of frequency measurement values, a time series of packet loss rate values, a time series of data error values, or a time series of pressure measurement values. Although various specific examples of the sensor data are presented, it should be understood that the sensor data can include measurements of one or more other mechanical, electromechanical, electrical, thermodynamic, or electronic metrics, or a combination thereof.

In a particular aspect, the sensor data 102 is multivariate data generated by multiple sensors of the same type or of different types. As an example of sensor data from multiple sensors of the same type, the sensor data 102 may include multiple time series of temperature values from temperature sensors associated with different locations of the monitored asset. As an example of sensor data from multiple sensors of different types, the sensor data 102 may include one or more time series of temperature values from one or more temperature sensors associated with the monitored asset and one or more time series of rotation rate values from one or more rotation sensors associated with the monitored assets.

The preprocessor 104 is configured to modify and/or supplement the sensor data 102 to generate preprocessed data for a first anomaly detection model 106 and for a second anomaly detection model 126. Operations performed by the preprocessor 104 include, for example, filtering operations to remove outlying data samples, to reduce or limit bias (e.g., due to sensor drift or predictable variations), to remove sets of samples associated with particular events (such as data samples during a start-up period or during a known failure event), denoising, etc. In some implementations, the preprocessor 104 may also, or in the alternative, add to the sensor data 102, such as imputation to fill in estimated values for missing data samples or to equalize sampling rates of two or more sensors. In some implementations, the preprocessor 104 may also, or in the alternative, scale or normalize values of the sensor data 102. In some implementations, the preprocessor 104 may also, or in the alternative, determine new data values based on data value(s) in the sensor data 102. To illustrate, the sensor data 102 may include an analog representation of audio data, and the preprocessor 104 may sample the audio data and perform a windowed time-domain to frequency-domain transformation (e.g., a Fast Fourier Transform) to generate a time series of frequency-domain spectra representing the audio data.

The preprocessor 104 may also, or alternatively, format input data for the first anomaly detection model 106 and the second anomaly detection model 126 based on the sensor data 102. For example, the preprocessed data for the first anomaly detection model 106 may include an array of data values of the sensor data 102 and/or data values derived from the sensor data 102 via various preprocessing operations. To illustrate, in a particular implementation, each row of the array of data values represents a time step and each column of the array of values represents a particular value included in or derived from the sensor data 102.

Preprocessed data generated by the preprocessor 104 and based on the sensor data 102 is illustrated as input data 150 that includes first data 152, second data 154, and third data 156. According to an aspect, the second data 154 is provided to the first anomaly detection model 106, the third data 156 is provided to the second anomaly detection model 126, and the first data 152 is provided to both of the first anomaly detection model 106 and the second anomaly detection model 126.

The first anomaly detection model 106 is trained to monitor a first aspect of operation of a monitored system based on the first data 152 and the second data 154, as described further with reference to FIGS. 2-5, and includes one or more behavior models. Each behavior model is trained to generate model output data based on at least a subset of the preprocessed data from the preprocessor 104. Examples of behavior models that may be included in the first anomaly detection model 106 include, without limitation, dimensional reduction models, autoencoders, time series predictors, feature predictors, etc.

In one example, the first anomaly detection model 106 includes an autoencoder that is trained to encode the input data into an encoded representation and to decode the encoded representation to generate the model output data. In this example, the model output data represents an attempt to recover the input data, and the difference between a particular input data sample and a corresponding output data sample is a residual value of first residuals data 108.

In another example, the first anomaly detection model 106 includes a time series predictor that is trained to predict the next value of a time series. To illustrate, the preprocessed data provided to the time series predictor may include current sensor data values associated with one or more sensors, and the time series predictor may generate the model output data indicating one or more predicted future values of the sensor data associated with the one or more sensors. In this example, a difference between one or more predicted future values of the sensor data and the corresponding actual values of the sensor data (received later in the time series) is a residual value of first residuals data 108.

In another example, the first anomaly detection model 106 includes a feature predictor that is trained to predict a value of one or more sensor data values based on one or more other sensor data values. To illustrate, the preprocessed data may include a temperature value from a temperature sensor, a rotation rate value from a rotation rate sensor, and a vibration value from a vibration sensor. In this illustrative example, the temperature value and the rotation rate value may be provided as input to the feature predictor, and the feature predictor may generate the model output data indicating a predicted vibration value. In this example, a difference between the predicted vibration value and the actual value as indicated in the preprocessed data is a residual value of first residuals data 108.

As explained below, the behavior model is trained using data representing normal operation of a monitored system (or operation associated with a particular operational mode). The first residuals data 108 are indicative of how well the behavior model of the first anomaly detection model 106 is able to represent operation of the monitored system as indicated by the sensor data 102. Thus, the first anomaly detection model 106 is tuned or trained to accurately (as indicated by a small residual) represent operation of the monitored system during normal operation of the monitored system. When the input data 150 includes data representing abnormal or anomalous behavior, the first anomaly detection model 106 is not able to accurately represent the first aspect of operation of the monitored system, and as a result, one or more residual values in the first residuals data 108 increase.

In the example illustrated in FIG. 1, a first risk score calculator 110 uses the first residuals data 108 to calculate risk scores to generate first risk index data 112. In a particular example, a value of the risk index (i.e., a risk score) is calculated for each time step of the input data 150. In a non-limiting example, the risk score is calculated as an L2-norm of a rolling mean of the residual values, where the rolling mean is determined based on a sliding aggregation window. In another non-limiting example, the risk score is calculated as a rolling mean of L2-norms of the residual values. In a particular aspect, the first anomaly detection model 106 is trained based on relationships (which may be nonlinear) between variables of training data. When the relationships between variables are similar in the training data set and the input data 150 based on the sensor data, the residual values will be small and therefore the risk scores will also be small. In contrast, the risk scores will be large when at least one feature is poorly reconstructed or poorly estimated. This situation is likely to occur when the relationship of that feature with other features of the input data has changed relative to the training data set.

In the example illustrated in FIG. 1, a first feature importance calculator 114 uses the first residuals data 108 to calculate feature importance scores to generate first feature importance data 116. In a particular example, a value of the first feature importance data 116 is calculated for each time step of the input data. In a non-limiting example, the feature importance is calculated as a rolling mean of the absolute value of the residual values.

In the example illustrated in FIG. 1, a first combiner 118 combines (e.g., concatenates) the first risk index data 112 and the first feature importance data 116 row-by-row to generate combined data for each time step. The combined data is provided to an alert generation model 140.

In the example illustrated in FIG. 1, the second anomaly detection model 126 is trained to monitor a second aspect of operation of a monitored system based on the first data 152 and the third data 156, as described further with reference to FIGS. 2-5. The second anomaly detection model 126 generates second residuals data 128 that is processed by a second risk score calculator 130 to generate second risk index data 132 associated with the second aspect of operation of the monitored system. The second residuals data 128 is also processed by a second feature importance calculator 134 to generate second feature importance data 136 associated with the second aspect of operation of the monitored system. The second risk index data 132 and the second feature importance data 136 are combined (e.g., concat-enated) by a second combiner 138 to generate combined data that is provided to the alert generation model. In a particular implementation, the second anomaly detection model 126, the second risk score calculator 130, the second feature importance calculator 134, and the second combiner 138 operate in a similar manner as described for the first anomaly detection model 106, the first risk score calculator 110, the first feature importance calculator 114, and the first combiner 118, respectively.

The alert generation model 140 processes the first combined data and the second combined data to determine whether to generate an alert indication. For example, the alert generation model 140 may use a sequential probability ratio test (SPRT) to determine, based on the first combined data, the second combined data, or a combination thereof, whether the sensor data for a particular time step or set of time steps is indicative of abnormal operation of the monitored asset(s), such as described in further detail with reference to FIGS. 5-8. If the alert generation model 140 determines to generate an alert indication, the alert indication may include feature importance data indicating which features of the sensor data (or of the input data) have the greatest influence on the determination that the monitored asset(s) are behaving abnormally.

In some implementations, the preprocessor 104 adds values to the sensor data 102 to generate the input data 150, which is referred to as "imputation". In such implementations, the imputed value(s) are estimates that may be incorrect. The first anomaly detection model 106, the second anomaly detection model 126, or both, may not accurately reconstruct such imputed values, which results in high residual values associated with the imputed values. Such high residual values can skew the first risk index data 112, the first feature importance data 116, the second risk index data 132, the second feature importance data 136, or a combination thereof. To reduce downstream effects of errors introduced by the imputation of values, residual values corresponding to such imputed values may be masked out of the first residuals data 108 and the second residuals data 128, before the first risk index data 112, the first feature importance data 116, the second risk index data 132, the second feature importance data 136, or a combination thereof, are calculated.

In some implementations, whether to mask out values of the first residuals data 108 and the second residuals data 128 that correspond to imputed values of the input data is based on a user configurable setting. To illustrate, if a user is confident in an imputation process used by the preprocessor 104 for a particular feature or if the user has a high tolerance for false positives, the user can configure the user configurable setting to allow the first risk score calculator 110, the second risk score calculator 130, or both, to calculate risk scores based on residuals data corresponding to imputed values. Conversely, if the user is not confident in the imputation process used by the preprocessor 104 for the particular feature or if the user has a low tolerance for false positives, the user can configure the user configurable setting to mask out values of the first residuals data 108 and the second residuals data 128 corresponding to imputed values before the first risk score calculator 110 and the second risk score calculator 130 calculate risk scores. Similar options may be available to use or not use (e.g., mask out) residual data corresponding to an imputed value for purposes of feature importance calculation. In some implementations, the user configurable setting specifies how residual data corresponding to imputed values are treated for all features (e.g., the first residuals data 108 corresponding to imputed values are masked for all features of the input data or are unmasked for all features of the input data). In other implementations, a user configurable setting is associated with each feature of the input data or with groups of features of the input data (e.g., sensor data from each temperature sensor of a set of temperature sensors). In such implementations, each user configurable setting operates as described above with respect to its corresponding feature or group of features.

By using multiple anomaly detection models to monitor multiple domains or components of a monitored asset, training of each of the anomaly detection models 106, 126 can be simplified as compared to using a single global model for the monitored asset. In addition, separate training of each of the anomaly detection models 106, 126 can provide greater accuracy in detecting anomalous behavior, such as when an extent of fluctuations in the second data 154 differs from that of the third data 156 due to the influence of one or more control systems of the monitored asset. Also, each of the anomaly detection models 106, 126 operates on a smaller set of input data and therefore has an enhanced ability to detect relatively brief events as compared to a single global model that operates on the full set of input data.

Figure 2:
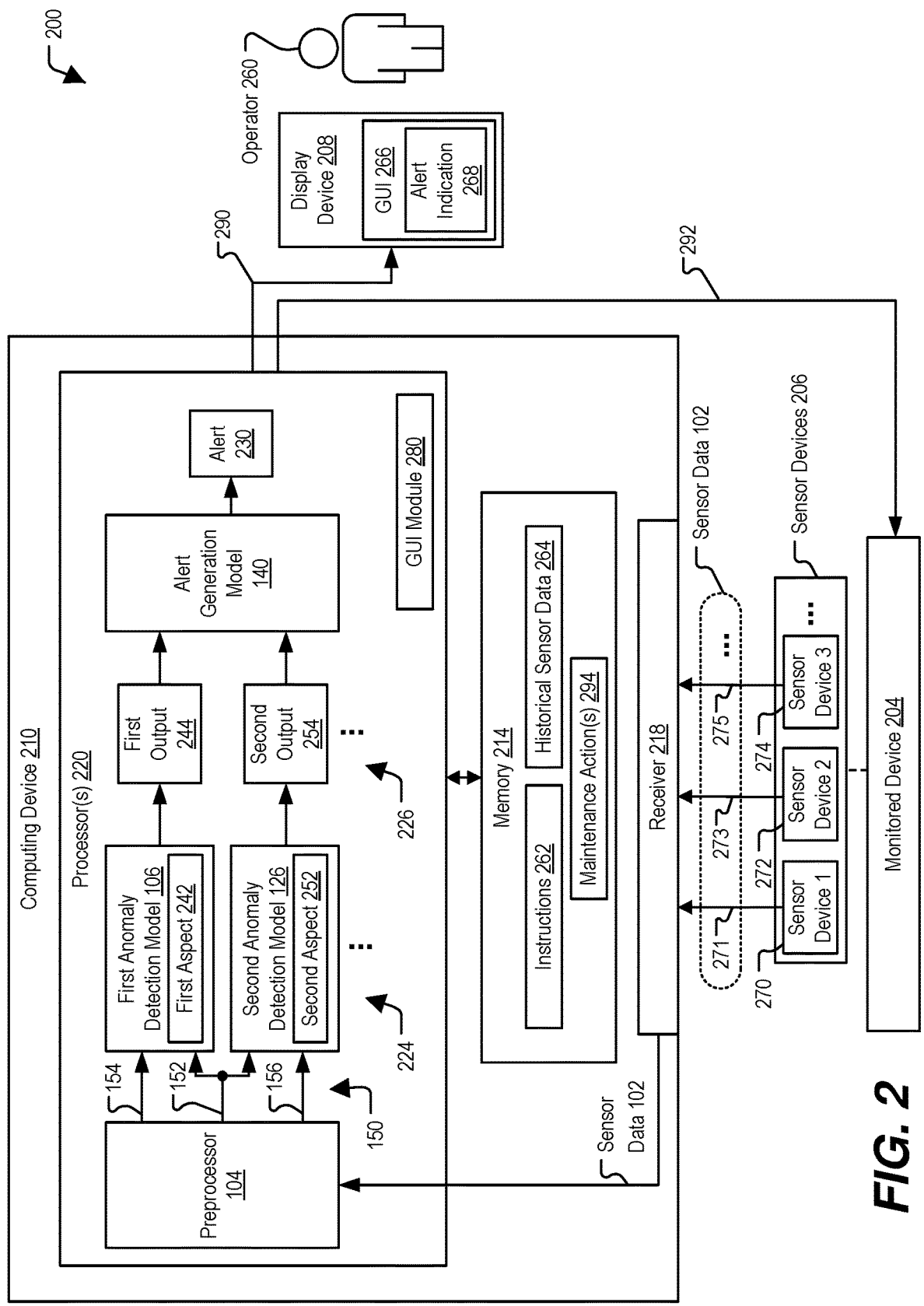
FIG. 2 is a block diagram illustrating a particular implementation of a system that may perform the operations of FIG. 1 in accordance with some examples of the present disclosure.

FIG. 2 depicts a system 200 to detect anomalous behavior of a monitored asset. In this context, a "monitored asset" refers to one or more devices, one or more systems, or one or more processes that are monitored to detect abnormal behavior, and is represented as a monitored device 204. To illustrate, the monitored device 204 can include one or more mechanical devices, one or more electromechanical devices, one or more electrical devices, one or more electronic devices, or various combinations thereof.

The system 200 includes multiple sensor devices 206 coupled to the monitored device 204. A computing device 210 is coupled to the sensor devices 206 and to a display device 208. In various implementations, the computing device 210 is configured to use multiple trained anomaly detection models 224 to determine, based on sensor data 102 generated by the multiple sensor devices 206, whether the monitored device 204 is operating normally or abnormally and to selectively provide an alert indication 268 to an operator 260 (e.g., a technician or subject matter expert (SME)), as described further below.

The sensor devices 206 include a first sensor device 270, a second sensor device 272, and a third sensor device 274, each of which is coupled to the monitored device 204 and configured to monitor a respective aspect of operation of the monitored device 204. The first sensor device 270 is configured to generate first sensor data 271, the second sensor device 272 is configured to generate second sensor data 273, and the third sensor device 274 is configured to generate third sensor data 275. In an illustrative, non-limiting example, the first sensor device 270 corresponds to a temperature sensor and the first sensor data 271 corresponds to temperature measurements, the second sensor device 272 corresponds to a pressure sensor and the second sensor data 273 corresponds to pressure measurements, and the third sensor device 274 corresponds to a rotation sensor and the third sensor data 275 corresponds to rotation rate measurements. The first sensor data 271, the second sensor data 273, and the third sensor data 275 are included in the sensor data 102 that is provided to the computing device 210. Although three sensor devices 206 are illustrated, it should be understood that any number of sensor devices 206 (e.g., tens, hundreds, or more) may be used to monitor operation of the monitored device 204.

The computing device 210 includes a receiver 218 and a memory 214 that are coupled to one or more processors 220. In some implementations, the memory 214 includes volatile memory devices, non-volatile memory devices, or both, such as one or more hard drives, solid-state storage devices (e.g., flash memory, magnetic memory, or phase change memory), a random access memory (RAM), a read-only memory (ROM), one or more other types of storage devices, or any combination thereof. The memory 214 stores data (e.g., historical sensor data 264) and instructions 262 (e.g., computer code) that are executable by the one or more processors 220. For example, the instructions 262 can include one or more trained models (e.g., trained machine learning models) that are executable by the one or more processors 220 to initiate, perform, or control various operations associated with alert generation based on detecting anomalous behavior of the monitored device 204. For example, the one or more trained models can include the multiple anomaly detection models 224 (e.g., the first anomaly detection model 106 and the second anomaly detection model 126), the alert generation model 140, or a combination thereof.

The receiver 218 is configured to receive the sensor data 102 from the sensor devices 206. In an example, the receiver 218 includes a bus interface, a wireline network interface, a wireless network interface, or one or more other interfaces or circuits configured to receive the sensor data 102 via wireless transmission, via wireline transmission, or any combination thereof.

The one or more processors 220 include one or more single-core or multi-core processing units, one or more digital signal processors (DSPs), one or more graphics processing units (GPUs), or any combination thereof. The one or more processors 220 are configured to receive, via the receiver 218, a portion of the sensor data 102 sensed during a sensing period. The one or more processors 220 include the preprocessor 104 configured to preprocess the portion of the sensor data 102 to generate the input data 150 for the first anomaly detection model 106 and the second anomaly detection model 126.

The first anomaly detection model 106 is trained to monitor a first aspect 242 of operation of the device 204, and the second anomaly detection model 126 is trained to monitor a second aspect 252 of operation of the device 204. The first aspect 242 of operation of the device 204 is different from the second aspect 252 of operation of the device 204. To illustrate, in some examples, the first anomaly detection model 106 is configured to monitor behavior of a first component of the device 204, and the second anomaly detection model 126 is configured to monitor behavior of a second component of the device 204, such as described further with reference to FIG. 3. In some other examples, the first anomaly detection model 106 is configured to monitor a first physical system of the device 204, and the second anomaly detection model 126 is configured to monitor a second physical system of the device 204, such as described further with reference to FIG. 4.

The one or more processors 220 are configured to use the multiple anomaly detection models 224 to generate outputs 226 which are used to determine whether to generate an alert 230. For example, the one or more processors 220 are configured to use the first anomaly detection model 106 to generate a first output 244 for each sensing period, such as the first residuals data 108, the first risk index data 112, the first feature importance data 116, the output of the first combiner 118, or a combination thereof. The one or more processors 220 are configured to use the second anomaly detection model 126 to generate a second output 254 for each sensing period, such as the second residuals data 128, the second risk index data 132, the second feature importance data 136, the output of the second combiner 138, or a combination thereof. The one or more processors 220 are also configured to process the outputs 226 (e.g., the first output 244 and the second output 254) using the alert generation model 140 to determine whether to generate the alert 230.

A graphical user interface (GUI) module 280 is executable by the one or more processors 220 to generate a graphical user interface 266 to display the alert indication 268. For example, in response to the alert generation model 140 generating the alert 230, the GUI module 280 may be executed by the one or more processors 220 to cause the computing device 210 to provide a display output 290 to the display device 208. Responsive to the display output 290, the GUI 266 is displayed at the display device 208 to provide the operator 260 with the alert indication 268. The GUI 266 may also provide additional information related to the alert 230, such as feature importance data. In a particular implementation, the GUI 266 provides information regarding which of the multiple anomaly detection models 224 triggered, or contributed to, generation of the alert 230, enabling the operator 260 to more quickly locate a source of abnormal operation in the monitored device 204. An illustrative example of the GUI 266 is described further with reference to FIG. 10.

According to a particular aspect, the one or more processors 220 are configured to send a control signal 292 to the monitored device 204 based on the outputs 226 of the multiple anomaly detection models 224. In an example, in response to the alert generation model 140 generating the alert 230 based on the outputs 226, the one or more processors 220 include one or more commands in the control signal 292 to modify operation of the monitored device 204, such as to change an operational mode or to shut down operation of the monitored device 204. Changing the operational mode may enable more efficient investigation into causes or remedies of the behavioral deviation of the monitored device 204 that are responsible for the alert 230. Alternatively, or in addition, changing the operational mode or shutting down the monitored device 204 may preserve the monitored device 204, or other systems or devices coupled to the monitored device 204, from potential damage due to irregular operation. To illustrate, the alert 230 may be generated in response to initial changes in operation due to a faulty component (e.g., a valve or electrical switch) of the monitored device 204. Automatically adjusting operation of the monitored device 204 via the control signal 292 may mitigate or prevent damage that may otherwise occur due to continued operation using the faulty component.

According to another particular aspect, the one or more processors 220 are configured to schedule one or more maintenance actions 294 for the monitored device 204 based on the outputs 226 of the multiple anomaly detection models 224. In an example, in response to the alert generation model 140 generating the alert 230 based on the outputs 226, the one or more processors 220 identify the one or more particular maintenance actions 294, such as scheduling an inspection of the monitored asset. In other examples, the one or more processors 220 identify the one or more particular maintenance actions 294 from a stored list or database of maintenance actions that are associated with various potential or historical events. The selected maintenance actions may include specific maintenance recommendations (e.g., replacement of a specific part or component) based on the nature of the deviation from normal operation that triggered the alert 230. To illustrate, the one or more processors 220 may select the one or more maintenance actions 294 based on the feature importance data associated with generation of the alert 230. The selected one or more maintenance actions 294 may be automatically scheduled and announced to the operator 260 via the GUI 266. In some implementations, the GUI 266 provides the operator 260 the ability to alter or reject one or more of the automatically scheduled maintenance action(s) 294.

During operation, the sensor devices 206 generate the sensor data 102 by measuring physical characteristics, electromagnetic characteristics, radiologic characteristics, or other measurable characteristics. Each sensor device generates a time series of measurements. The time series from a particular sensor device is also referred to herein as a "feature" or as "feature data." Different sensor devices may have different sample rates. One or more of the sensor devices 206 may generate sensor data samples periodically (e.g., with regularly spaced sampling periods), and one or more others of the sensor devices 206 may generate sensor data samples occasionally (e.g., whenever a state change occurs).

The preprocessor 104 receives the sensor data 102 for a particular timeframe. During some timeframes, the sensor data 102 for the particular timeframe may include a single data sample for each feature. During some timeframes, the sensor data 102 for the particular timeframe may include multiple data samples for one or more of the features. During some timeframes, the sensor data 102 for the particular timeframe may include no data samples for one or more of the features. As one example, if the sensor devices 206 include a first sensor that only registers state changes (e.g., on/off state changes), a second sensor that generates a data sample once per second, and a third sensor that generates 10 data samples per second, and the preprocessor 104 processes one-second timeframes, then for a particular timeframe, the preprocessor 104 may receive sensor data 102 that includes no data samples from the first sensor (e.g. if no state change occurred), one data sample from the second sensor, and ten samples from the third sensor. Other combinations of sampling rates and preprocessing timeframes are used in other examples.

The preprocessor 104 generates input data for the first anomaly detection model 106 and the second anomaly detection model 126 based on the sensor data 102. For example, the preprocessor 104 may resample the sensor data 102, may filter the sensor data 102, may impute data, may use the sensor data (and possibly other data) to generate new feature data values, may perform other preprocessing operations as explained with reference to FIG. 1, or a combination thereof. In a particular aspect, the specific preprocessing operations that the preprocessor 104 performs are determined based on the training of the first anomaly detection model 106, the second anomaly detection model 126, the alert generation model 140, or a combination thereof.

For example, the first anomaly detection model 106 is trained to accept as input a specific first set of features, including the first data 152 and the second data 154, and the preprocessor 104 is configured to generate, based on the sensor data 102, input data for the first anomaly detection model 106 including the specific first set of features. Similarly, the second anomaly detection model 126 is trained to accept as input a specific second set of features, including the first data 152 and the third data 156, and the preprocessor 104 is configured to generate, based on the sensor data 102, input data for the second anomaly detection model 126 including the specific second set of features.

As an illustrative, non-limiting example, the monitored device 204 may include a gas turbine engine having a compressor and a combustor that are both mechanically coupled to a shaft. The first anomaly detection model 106 monitors operation of the compressor, and the second anomaly detection model 126 monitors operation of the combustor. The first sensor device 270 may include a rotation rate sensor that is coupled to the shaft, and the preprocessor 104 may generate the first data 152 based on the first sensor data 271. The first data 152 is included as input to both of the first anomaly detection model 106 and the second anomaly detection model 126 for use with modeling the behavior of the compressor and also for use with modeling the behavior of the combustor. The second sensor device 272 may monitor one or more aspects of the compressor (e.g., vibration at the compressor), and the preprocessor 104 may generate the second data 154 at least partially based on the second sensor data 273. The third sensor device 274 may monitor one or more aspects of the combustor (e.g., temperature at the combustor), and the preprocessor 104 may generate the third data 156 at least partially based on the third sensor data 275.

In a particular aspect, the first anomaly detection model 106 generates the first output 244 and the second anomaly detection model 126 generates the second output 254 for each data sample of the input data. The first output 244 includes or corresponds to the first residuals data 108, the first risk index data 112, the first feature importance data 116, or any combination thereof. For example, the first output 244 may include data generated by the first combiner 118. The second output 254 includes or corresponds to the second residuals data 128, the second risk index data 132, the second feature importance data 136, or any combination thereof. For example, the second output 254 may include data generated by the second combiner 138. In some implementations, such as described further with reference to FIG. 5, the first anomaly detection model 106, the second anomaly detection model 126, or both, is further configured to generate an alert indication that may be provided in the outputs 226 as an input to the alert generation model 140 in place of, or in addition to, the residuals data, the risk index data, the feature importance data, or combinations thereof.

The alert generation model 140 evaluates the first output 244 and the second output 254 to determine whether to generate the alert 230. As one example, the alert generation model 140 compares one or more values of the first output 244 and the second output 254 to one or more respective thresholds to determine whether to generate the alert 230. The respective threshold(s) may be preconfigured or determined dynamically (e.g., based on one or more of the sensor data values, based on one or more of the input data values, based on one or more of the anomaly score values, or based on one or more received alert indications). In a particular implementation, the alert generation model 140 determines whether to generate the alert 230 using a sequential probability ratio test (SPRT) based on current anomaly score values and historical anomaly score values (e.g., based on the historical sensor data 264).

In some implementations, in response to generation of the alert 230, the one or more processors 220 provide the display output 290 to display the alert indication 268 at the display device 208, provide the control signal 292 to control operation of the monitored device 204, schedule one or more of the maintenance actions 294, or any combination thereof.

Thus, the system 200 enables detection of deviation from an operating state of the asset, such as detecting a transition from a first operating state (e.g., a "normal" state to which the model is trained) to a second operating state (e.g., an "abnormal" state). In some implementations, the second operating state, although distinct from the first operating state, may also be a "normal" operating state that is not associated with a malfunction or fault of the monitored device 204.

Although FIG. 2 depicts the display device 208 as coupled to the computing device 210, in other implementations the display device 208 is integrated within the computing device 210. Although the display device 208 is illustrated as providing the alert indication 268 via the GUI 266 at the display device 208, in other implementations the alert indication 268 may alternatively, or additionally, be provided via one or more other mechanisms, such as an output interface that includes at least one of a light, a buzzer, or a signal port. In some implementations, functionality corresponding to the sensor devices 206 and the computing device 210 are integrated into a single device, such as within a common housing.

Although FIG. 2 depicts two anomaly detection models, in other implementations the multiple anomaly detection models 224 include three or more anomaly detection models. In some implementations, a distinct anomaly detection model is included to monitor operation of each distinct monitored aspect (e.g., each monitored component, each monitored physical system, or combinations thereof) of the monitored device 204. For example, the computing device 210 may monitor operation of an engine that includes a compressor, a turbine, and a combustor using the first anomaly detection model 106 to monitor operation of the compressor, the second anomaly detection model 126 to monitor operation of the turbine, and a third anomaly detection model to monitor operation of the combustor.

Although examples provided above describe each of the first data 152, the second data 154, and the third data 156 as based on respective sensor data from a single respective sensor device, it should be understood that each of the first data 152, the second data 154, and the third data 156 can include or be based on sensor data from multiple sensor devices. In general, the first data 152 may represent a collection of feature data output by the preprocessor 104 that is determined to be useful for multiple anomaly detection models. The second data 154 represents a collection of feature data that is determined to be useful for monitoring operation of the first aspect 242 at the first anomaly detection model 106 but not useful (e.g., providing little to no benefit) for monitoring operation of the second aspect 252 at the second anomaly detection model 126. Similarly, the third data 156 represents a collection of feature data that is determined to be useful for monitoring operation of the second aspect 252 at the second anomaly detection model 126 but not useful (e.g., providing little to no benefit) for monitoring operation of the first aspect 242 at the first anomaly detection model 106.

In some examples, the second data 154, the third data 156, or both, may be omitted. To illustrate, in an example in which all input data used by the first anomaly detection model 106 to monitor the first aspect 242 is also used by the second anomaly detection model 126 to monitor the second aspect 252, the second data 154 is omitted. In another illustrative example, the first data 152 is input to each of the multiple anomaly detection models 224, and the second data 154 and the third data 156 are omitted.

It should be understood that although the described examples include each of the anomaly detection models 224 receiving common input data (e.g., the first data 152), in other examples one or more of the anomaly detection models 224 do not receive a common input. For example, a third anomaly detection model may receive fourth input from the preprocessor 104, and the fourth input may not include any features that are also included in the first data 152, the second data 154, or the third data 156. In other examples, multiple common inputs may be shared by various anomaly detection models. To illustrate, in some implementations, a third anomaly detection model may also receive the third data 156 (e.g., the third data 156 is shared by the second anomaly detection model 126 and the third anomaly detection model, but not by the first anomaly detection model 106). In general, each of anomaly detection models 224 may receive some inputs that are shared with one or more of the other anomaly detection models 224, one or more inputs that are not shared with any of the other anomaly detection models 224, or a combination thereof.

Figure 3:
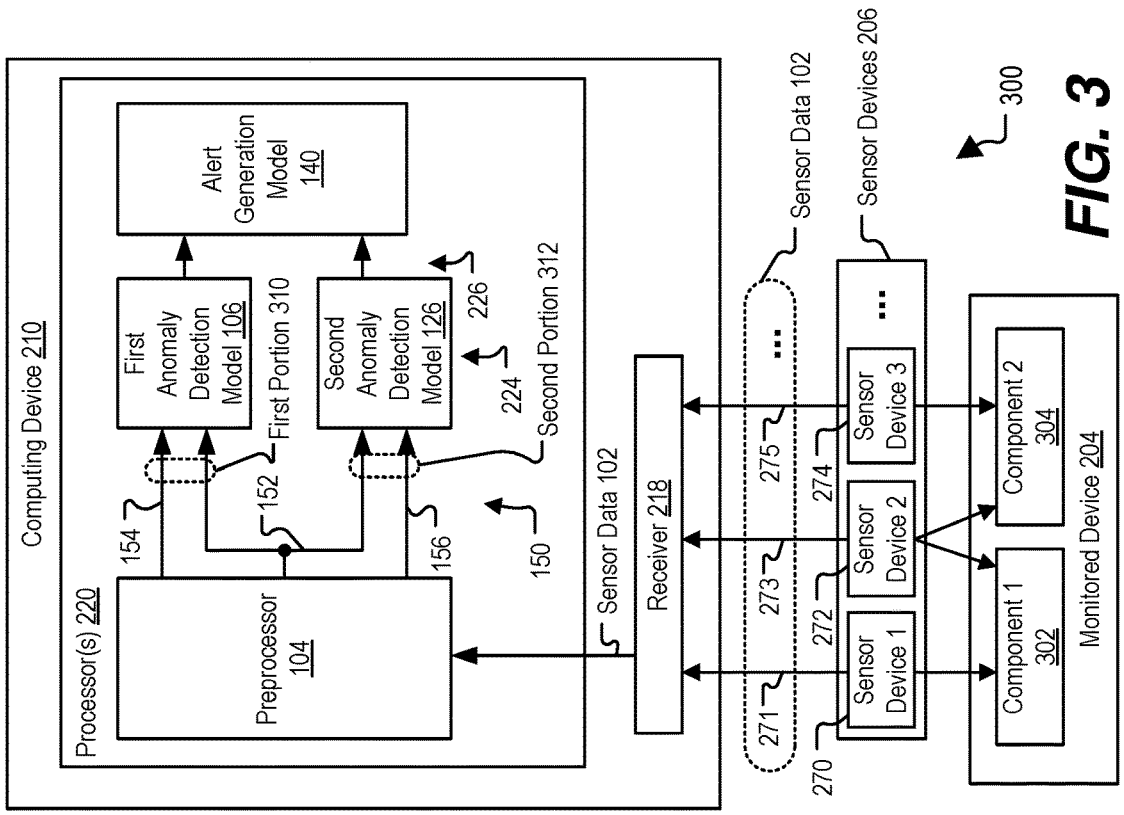
FIG. 3 is a block diagram illustrating an example of the system of FIG. 2 in which the multiple anomaly detection models monitor behavior of different components of the monitored asset.

FIG. 3 depicts an example of a system 300 that includes the computing device 210 and the sensor devices 206 configured to monitor behavior of multiple components of the monitored device 204. For example, the first anomaly detection model 106 is configured to monitor behavior of a first component 302 of the monitored device 204, and the second anomaly detection model 126 is configured to monitor behavior of a second component 304 of the monitored device 204. As used herein, a "component" can refer to a physical part of the monitored asset, such as a pump, a compressor, a motor, a lubricant system, a coolant system, etc. For example, in an illustrative example in which the monitored device 204 corresponds to a gas turbine engine that has a compressor, a combustor, and a turbine that are each coupled to a common shaft, the first component 302 corresponds to one of the compressor, the combustor, or the turbine, and the second component 304 corresponds to another of the compressor, the combustor, or the turbine. Because the rotation rate of the shaft is useful for detecting anomalous behavior of each of the compressor, the combustor, and the turbine, the first data 152 may correspond to (e.g., include) a shaft rotation rate.

As illustrated, the first data 152 is included in the input data 150, which corresponds to sensor data 102 from the multiple sensor devices 206 that are coupled to the device 204. The first anomaly detection model 106 processes a first portion 310 of the input data 150 that includes the first data 152, and the second anomaly detection model 126 processes a second portion 312 of the input data 150 that includes the first data 152. The first portion 310 is distinct from the second portion 312. For example, the first portion 310 also includes the second data 154 but does not include the third data 156, and the second portion 312 also includes the third data 156 but does not include the second data 154.

Figure 4:
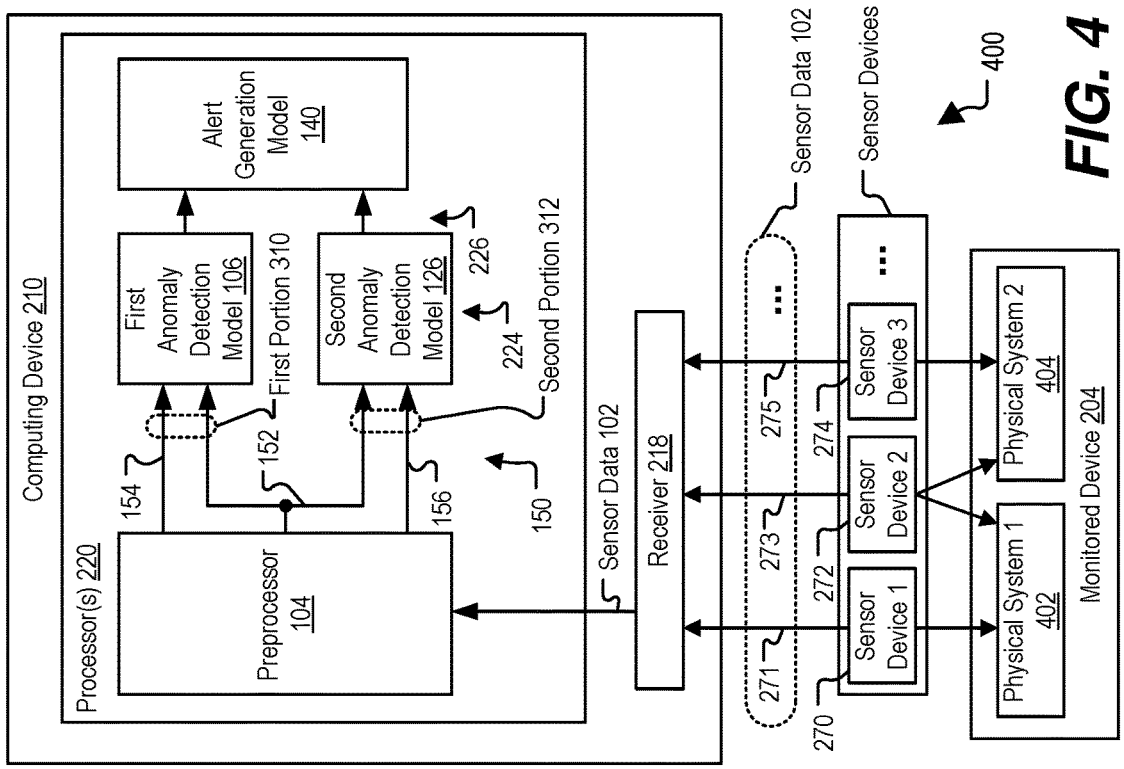
FIG. 4 is a block diagram illustrating an example of the system of FIG. 2 in which the multiple anomaly detection models monitor behavior of different physical systems of the monitored asset.

FIG. 4 depicts an example of a system 400 that includes the computing device 210 and the sensor devices 206 configured to monitor behavior of multiple physical systems of the monitored device 204. As used herein, a "physical system" can refer to groups of properties or behaviors that can be described in terms of one or more equations, such as thermodynamic equations involving temperatures, pressures, and flows, equations of motion, equations of heat transfer, vibration, or other modes of energy, mass, or momentum transfer in one or more materials, equations regarding electromagnetic interactions, etc. In a particular implementation, the first anomaly detection model 106 is configured to monitor a first physical system 402 of the monitored device 204, and the second anomaly detection model 126 is configured to monitor a second physical system 404 of the monitored device 204. In an illustrative example in which the monitored device 204 corresponds to a gas turbine engine, the first physical system 402 corresponds to a thermodynamic system, and the second physical system 404 corresponds to a materials system. Because a temperature measurement is useful for detecting anomalous behavior of the thermodynamic system and also for detecting anomalous behavior of the materials system, the first data 152 may correspond to a temperature of the monitored device 204 (e.g., the first data 152 may include temperature measurement data).

Figure 5:
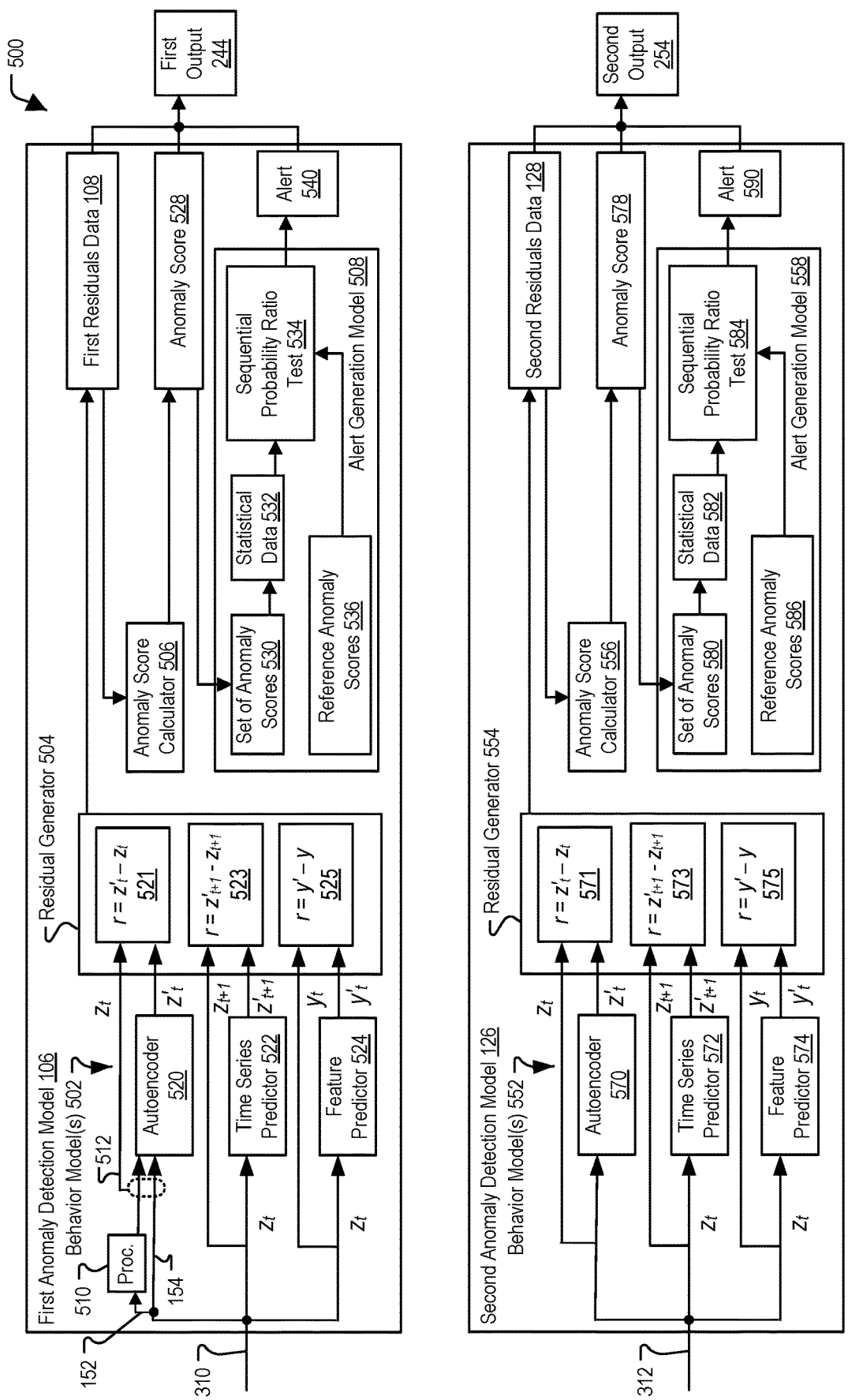
FIG. 5 is a block diagram of components that may be included in the system of FIG. 2 in accordance with some examples of the present disclosure.

FIG. 5 depicts a block diagram 500 of a particular implementation of components that may be included in the computing device 210 of FIG. 2, including the first anomaly detection model 106 and the second anomaly detection model 126.

As illustrated, the first anomaly detection model 106 includes one or more behavior models 502, a residual generator 504, and an anomaly score calculator 506. The one or more behavior models 502 include an autoencoder 520, a time series predictor 522, a feature predictor 524, another behavior model, or a combination thereof. Each of the behavior model(s) 502 is trained to receive the first portion 310 of the input data 150 (e.g., from the preprocessor 104) and to generate a model output. The residual generator 504 is configured to compare one or more values of the model output to one or more values of the first portion 310 of the input data 150 to determine the first residuals data 108.

The autoencoder 520 may include or correspond to a dimensional-reduction type autoencoder, a denoising autoencoder, or a sparse autoencoder. Additionally, in some implementations the autoencoder 520 has a symmetric architecture (e.g., an encoder portion of the autoencoder 520 and a decoder portion of the autoencoder 520 have mirror-image architectures). In other implementations, the autoencoder 520 has a non-symmetric architecture (e.g., the encoder portion has a different number, type, size, or arrangement of layers than the decoder portion).

The autoencoder 520 is trained to receive model input (denoted as $z_t$), modify the model input, and reconstruct the model input to generate model output (denoted as $z'_t$). The model input includes values of one or more features of the first portion 310 of the input data 150 (e.g., readings from one or more sensors) for a particular timeframe (t), and the model output includes estimated values of the one or more features (e.g., the same features as the model input) for the particular timeframe (t) (e.g., the same timeframe as the model input). In a particular, non-limiting example, the autoencoder 520 is an unsupervised neural network that includes an encoder portion to compress the model input to a latent space (e.g., a layer that contains a compressed representation of the model input), and a decoder portion to reconstruct the model input from the latent space to generate the model output. The autoencoder 520 can be generated and/or trained via an automated model building process, an optimization process, or a combination thereof to reduce or minimize a reconstruction error between the model input ($z_t$) and the model output ($z'_t$) when the first portion 310 of the input data 150 represents normal operation conditions associated with a monitored asset.

The time series predictor 522 may include or correspond to one or more neural networks trained to forecast future data values (such as a regression model or a generative model). The time series predictor 522 is trained to receive as model input one or more values of the first portion 310 of the input data 150 (denoted as $z_t$) for a particular timeframe (t) and to estimate or predict one or more values of the first portion 310 of the input data 150 for a future timeframe (t+N), where N is a positive integer, to generate model output (denoted as $z'_{t+N}$). The model input includes values of one or more features of the first portion 310 of the input data 150 (e.g., readings from one or more sensors) for the particular timeframe (t), and the model output includes estimated values of the one or more features (e.g., the same features at the model input) for a different timeframe (t+N) than the timeframe of the model input. The time series predictor 522 can be generated and/or trained via an automated model building process, an optimization process, or a combination thereof, to reduce or minimize a prediction error between the model input ($z_t$) and the model output ($z'_{t+N}$) when the first portion 310 of the input data 150 represents normal operation conditions associated with a monitored asset.

The feature predictor 524 may include or correspond to one or more neural networks trained to predict data values based on other data values (such as a regression model or a generative model). The feature predictor 524 is trained to receive as model input one or more values of the first portion 310 of the input data 150 (denoted as $z_t$) for a particular timeframe (t) and to estimate or predict one or more other values of the first portion 310 of the input data 150 (denoted as $y_t$) to generate model output (denoted as $y'_t$). The model input includes values of one or more features of the first portion 310 of the input data 150 (e.g., readings from one or more sensors) for the particular timeframe (t), and the model output includes estimated values of the one or more other features of the first portion 310 of the input data 150 for the particular timeframe (t) (e.g., the same timeframe as the model input). The feature predictor 524 can be generated and/or trained via an automated model building process, an optimization process, or a combination thereof, to reduce or minimize a prediction error between the one or more other values ($y_t$) and the model output ($y'_t$) when the first portion 310 of the input data 150 represents normal operation conditions associated with a monitored asset.

The residual generator 504 is configured to generate a residual value (denoted as r) based on a difference between the model output of the behavior model(s) 502 and the first portion 310 of the input data 150. For example, when the model output is generated by an autoencoder 520, the residual 521 can be determined according to $r=z'_t-z_t$. As another example, when the model output is generated by a time series predictor 522, the residual 523 can be determined according to $r=z'_{t+N}-z_{t+N}$, where $z'_{t+N}$ is estimated based on data for a prior time step (t) and $z_{t+N}$ is the actual value of z for a later time step (t+N). As still another example, when the model output is generated by a feature predictor 524, the residual 525 can be determined according to $r=y'_t-y_t$, where $y'_t$ is estimated based on a value of z for a particular time step (t) and $y_t$ is the actual value of y for the particular time step (t). Generally, the first portion 310 of the input data 150 and the reconstruction are multivariate (e.g., a set of multiple values, with each value representing a feature of the first portion 310 of the input data 150), in which case multiple residuals are generated for each sample time frame to form the first residuals data 108 for the sample time frame.

The anomaly score calculator 506 determines an anomaly score 528 for a sample time frame based on the first residuals data 108.

As illustrated in FIG. 5, the first anomaly detection model 106 may also include an alert generation model 508 and may determine whether to generate an alert indication 540. The alert generation model 508 accumulates a set of anomaly scores 530 representing multiple sample time frames and uses the set of anomaly scores 530 to generate statistical data 532. In the illustrated example, the alert generation model 508 uses the statistical data 532 to perform a sequential probability ratio test 534 configured to selectively generate the alert indication 540. For example, the sequential probability ratio test 534 is a sequential hypothesis test that provides continuous validations or refutations of the hypothesis that the monitored asset is behaving abnormally, by determining whether the anomaly score 528 continues to follow, or no longer follows, statistics of the expected behavior of reference anomaly scores 536. In some implementations, the reference anomaly scores 536 include data indicative of a distribution of reference anomaly scores (e.g., mean and variance) instead of, or in addition to, the actual values of the reference anomaly scores. The sequential probability ratio test 534 provides an early detection mechanism and supports tolerance specifications for false positives and false negatives.

The first residuals data 108, the anomaly score 528, the alert indication 540, or any combination thereof, may be included in the first output 244.

The second anomaly detection model 126 includes one or more behavior models 552, a residual generator 554, an anomaly score calculator 556, and an alert generation model 558. The one or more behavior models 502 include an autoencoder 570, a time series predictor 572, a feature predictor 574, another behavior model, or a combination thereof. Each of the behavior model(s) 552 is trained to receive the second portion 312 of the input data 150 (e.g., from the preprocessor 104) and to generate a model output. The behavior model(s) 552 are configured to operate in a similar manner as described for the behavior model(s) 502. The residual generator 554 is configured to generate one or more residual values (e.g., residual 571, residual 573, residual 575) in a similar manner as described for the residual generator 504 to generate the second residuals data 128. The anomaly score calculator 556 determines an anomaly score 578 for a sample time frame based on the second residuals data 128.

The alert generation model 558 accumulates a set of anomaly scores 580 representing multiple sample time frames and uses the set of anomaly scores 580 to generate statistical data 582. In the illustrated example, the alert generation model 558 uses the statistical data 582 to perform a sequential probability ratio test 584 configured to selectively generate an alert indication 590 by determining whether the anomaly score 578 continues to follow, or no longer follows, normal behavior statistics of reference anomaly scores 586 in a similar manner as described for the sequential probability ratio test 534. The second residuals data 128, the anomaly score 578, the alert indication 590, or any combination thereof, may be included in the second output 254.

As illustrated, the first anomaly detection model 106 also includes a processing unit 510 configured to process the first data 152 (or a portion of the first data 152) to generate autoencoder input data 512. For example, the processing unit 510 may operate as a secondary preprocessing stage (e.g., performing additional processing on data from the preprocessor 104 prior to being input to the behavior model(s) 502). The autoencoder 520 is configured to process the autoencoder input data 512 to generate one or more residuals 521 indicative of an anomaly.

To illustrate, in a particular implementation, the first anomaly detection model 106 corresponds to a thermodynamic model that uses an inverse of a square root of the temperature (1/sqrt(T)), and the second anomaly detection model 126 corresponds to a metal dilation model that is linear with temperature. The first data 152 may correspond to temperature data, and the processing unit 510 in the first anomaly detection model 106 can process each incoming temperature measurement (T) and output a value corresponding to an inverse of a square root of the temperature (1/sqrt(T)), thus casting the temperature data into a more natural form for processing (in conjunction with the second data 154) at the autoencoder 520 based on the thermodynamic model. The metal dilation model of the second anomaly detection model 126 may be linear with temperature, and therefore the second anomaly detection model 126 may use the temperature data as input into the autoencoder 570 without additional processing.

In some implementations, the processing unit 510 is configured to process one or more other features received at the first anomaly detection model 106 to generate input data that is more accurately or efficiently processed by the autoencoder 520. The processing unit 510 may perform different types of processing (e.g., exponentiation, logarithms, trigonometric conversion, frequency domain transforms, etc.) for different features. In some examples, the processing unit 510 may operate on multiple features to generate a combined feature, such as by generating a feature representing the result of raising a ratio of two input features to a particular power (e.g., (feature1/feature2)$^2$). The processing unit 510 may also, or alternatively, perform processing of features of the second data 154 instead of, or in addition to, processing features of the first data 152. In some implementations, the second anomaly detection model 126 also includes a processing unit to process data to be input to one or more of the behavior model(s) 552. Although FIG. 5 illustrates the processing unit 510 implemented in the first anomaly detection model 106, in other implementations operations described as being performed by the processing unit 510 are instead performed by the preprocessor 104.

Figure 6:
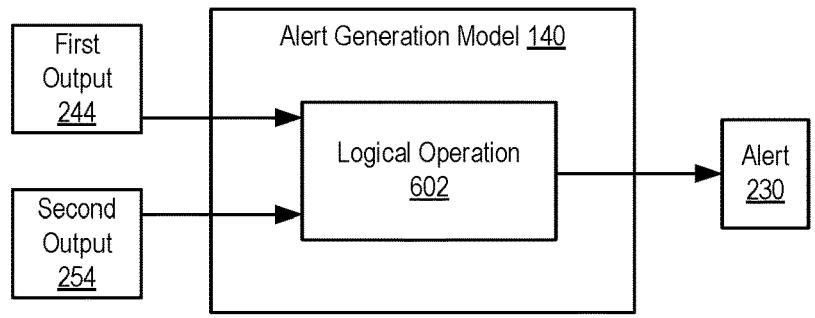
FIG. 6 is a block diagram of a particular implementation of an alert generation model that may be included in the system of FIG. 2 in accordance with some examples of the present disclosure.
Figure 7:
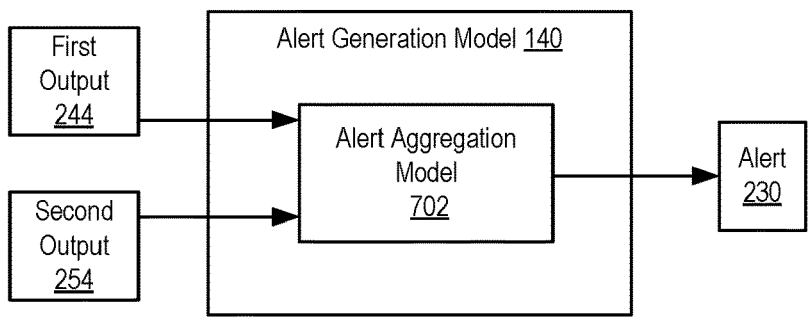
FIG. 7 is a block diagram of another implementation of an alert generation model that may be included in the system of FIG. 2 in accordance with some examples of the present disclosure.
Figure 8:
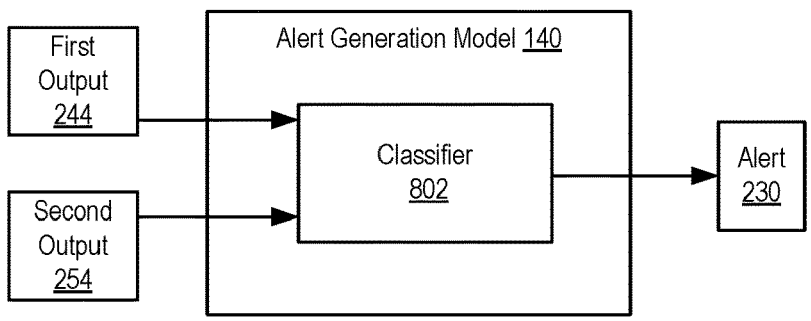
FIG. 8 is a block diagram of another implementation of an alert generation model that may be included in the system of FIG. 2 in accordance with some examples of the present disclosure.

FIG. 6, FIG. 7, and FIG. 8 illustrate various implementations of the alert generation model 140 including different mechanisms to determine whether to generate the alert 230. In FIG. 6, the determination made by the alert generation model 140 whether to generate the alert 230, based on the outputs 226 of the multiple anomaly detection models 224, includes performing a logical operation 602 on the outputs 226. In FIG. 7, the determination includes processing the outputs 226 at an alert aggregation model 702. In FIG. 8, the determination includes processing the outputs 226 at a classifier 802, as discussed further below.

FIG. 6 illustrates an implementation 600 of the alert generation model 140 configured to generate the alert 230 based on a logical operation 602 performed on the first output 244 of the first anomaly detection model 106 and the second output 254 of the second anomaly detection model 126. In an example, the first output 244 includes a first indication of whether the first anomaly detection model 106 generated an alert (e.g., the alert indication 540 of FIG. 5), and the second output 254 includes a second indication of whether the second anomaly detection model 126 generated an alert (e.g. the alert indication 590 of FIG. 5).

In a first illustrative example, the logical operation 602 includes an OR operation that generates the alert 230 responsive to any one or more of the first output 244 and the second output 254 indicating an alert, and does not generate the alert 230 when both of the first output 244 and the second output 254 do not indicate an alert. In a second illustrative example, the logical operation 602 includes an AND operation that generates the alert 230 responsive to both of the first output 244 and the second output 254 indicating an alert, and does not generate the alert 230 when either of the first output 244 or the second output 254 does not indicate an alert.

The logical operation 602 is not limited to the above examples, and can be extended to include implementations in which the alert generation model 140 receives outputs from more than two anomaly detection models. For example, the logical operation 602 may include generating the alert 230 in response to a threshold number (e.g., one, two, a majority, etc.) of the received outputs indicating an alert. As another example, the logical operation 602 may include evaluating a logical expression such as (O1 AND O2) OR O3, where O1=1 when the first output 244 indicates an alert and O1=0 when the first output 244 does not indicate an alert, O2=1 when the second output 254 indicates an alert and O2=0 when the second output 254 does not indicate an alert, and O3=1 when a third received output indicates an alert and O3=0 when the third received output does not indicate an alert.

FIG. 7 illustrates an implementation 700 of the alert generation model 140 configured to generate the alert 230 based on processing the first output 244 and the second output 254 at an alert aggregation model 702. For example, the alert aggregation model 702 may include one or more models that have been trained to receive information from the first output 244 and the second output 254 as an input vector (e.g., an embedding) and to determine whether the input vector is indicative of occurrence of a particular type of event (referred to as an "alert condition") at the monitored asset.

FIG. 8 illustrates an implementation 800 of the alert generation model 140 configured to generate the alert 230 based on processing the first output 244 and the second output 254 at a classifier 802. For example, the classifier 802 may be trained to receive information from the first output 244 and the second output 254 as an input vector (e.g., an embedding) and to classify the input vector as either corresponding to an alert condition or not corresponding to an alert condition.

In a particular implementation, the alert aggregation model 702 of FIG. 7, the classifier 802 of FIG. 8, or both, are trained to detect the presence or absence of alert indications in the received outputs and to determine, based at least partially on the presence or absence of particular alerts in each of the received outputs, whether to generate an alert 230. In some implementations the alert aggregation model 702, the classifier 802, or both are further trained to determine whether to generate an alert 230 based on additional data received via the received outputs, such as residuals data, anomaly scores, other data received in one or more of the outputs from the multiple anomaly detection models 224, or combinations thereof. Thus, in some implementations, the alert aggregation model 702, the classifier 802, or both may identify an alert 230 even though none of the multiple anomaly detection models 224 individually detected an alert. Such an alert may be based, for example, on combinations of one or more residual values in the first residuals data 108 and one or more residual values in the second residuals data 128, providing alert detection across multiple domains, multiple components, or both.

As another example, the first anomaly detection model 106 may identify that a first component of the monitored device 204 operates in a first operating mode that is not considered abnormal and that does not cause the first anomaly detection model 106 to generate the alert indication 540. Similarly, the second anomaly detection model 126 may identify that a second component of the monitored device 204 operates in a second mode that is also not considered abnormal and that does not cause the second anomaly detection model 126 to generate the alert indication 590. However, the alert aggregation model 702, the classifier 802, or both may be trained to detect that the first component operating in the first mode while the second component is operating in the second mode is indicative of anomalous behavior of the monitored device 204, and as a result the alert generator model 140 generates the alert 230.

Figure 9:
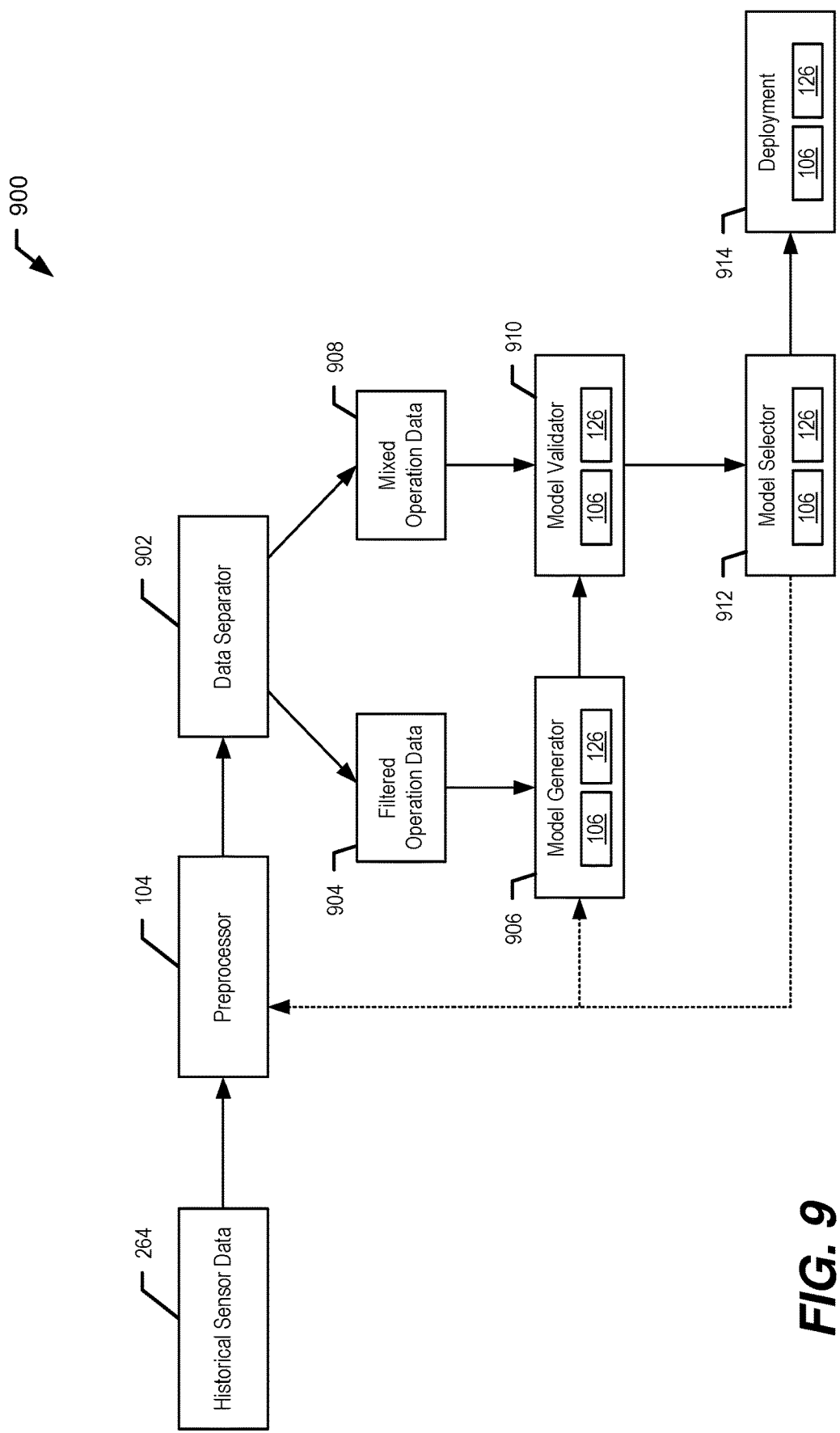
FIG. 9 is a block diagram illustrating particular aspects of operations to generate the anomaly detection models of FIG. 2 in accordance with some examples of the present disclosure.

FIG. 9 is a block diagram 900 illustrating particular aspects of operations to generate the anomaly detection models 224, such as the first anomaly detection model 106 and the second anomaly detection model 126, in accordance with some examples of the present disclosure. The operations illustrated in FIG. 9 are performed by one or more processors, such as the processor(s) 220 of FIG. 2, which may include processor(s) of one or more server or cloud-based computing systems, one or more control systems, one or more desktop or laptop computers, one or more internet of things devices, etc. Data used by and generated by various of the operations are also illustrated in FIG. 9.

In FIG. 9, the historical sensor data 264 is received and preprocessed at the preprocessor 104. The preprocessor 104 operates as described with reference to FIGS. 1 and 2 except that the preprocessor 104 in FIG. 9 can use various configurable settings to determine how to preprocess the historical sensor data 264. After an anomaly detection model is generated and deployed to monitor one or more monitored assets, the settings used by the preprocessor 104 of FIG. 9 to generate the deployed anomaly detection model are fixed, as described with reference to FIG. 2.

Examples of settings that can be configured or tested during generation of an anomaly detection model include an output data setting (e.g., "output_tags") that indicates which features are to be predicted to produce residuals data, such as the first residuals data 108 or the second residuals data 128. In some implementations, the settings include an input data setting (e.g., "input_tags") that indicates which features of the historical sensor data 264 are to be provided as input to one or more models being trained. In such implementations, the output data setting may be set to be identical to the input data setting. In some implementations, the output data setting may identify a subset of the input data setting. In other implementations (such as when the behavior model(s) include a feature predictor 524), the output data setting is different from the input data setting.

In some implementations, a feature importance value will be determined (e.g., by the first feature importance calculator 114 of FIG. 1) for each feature identified by the output data setting. In other implementations, a feature data setting is used to indicate which features of the output data should be used to determine a corresponding feature data value. In such implementations, a feature importance value may be determined for each feature of the output data or for only a subset (e.g., less than all) of the features of the output data.

In some implementations, a risk score value will be determined (e.g., by the first risk score calculator 110) for each feature identified by the output data setting. In other implementations, a risk data setting is used to indicate which features of the output data should be used to determine a corresponding risk score. In such implementations, a risk score may be determined for each feature of the output data or for only a subset (e.g., less than all) of the features of the output data. Further, in some implementations, risk scores may be calculated for a first set of features and feature importance values may be calculated for a second set of features. In such implementations, the first set of features and the second set of features generally overlap but need not be identical. For example, risk scores can be calculated for a subset of features that are used to calculate feature importance values, or vice versa.

In some implementations, the settings used by the preprocessor 104 may indicate how particular features of the historical sensor data 264 are to be modified during preprocessing. For example, a digital setting may be associated with a feature to indicate that the feature has two valid values (e.g., on/off, etc.).

As another example, one or more scaling settings associated with a feature may indicate whether and/or how feature values of the feature are to be scaled. One type of scaling that can be used includes binning values into one or more predefined bins or one or more bins based on characteristics of the feature data. To illustrate, a first value (e.g., a 0) may be assigned to feature values that are near the average value (e.g., within one standard deviation of the mean value, etc.), a second value (e.g., −1) may be assigned to feature values that are much less than the average value (e.g., more than one standard deviation below the mean value, etc.), and a third value (e.g., 1) may be assigned to feature values that are much greater than the average value (e.g., more than one standard deviation above the mean value, etc.). Other examples of scaling that can be applied to a feature include minmax scaling, nonlinear scaling, and linear scaling (also referred to as "standard" scaling or z-score scaling). One example of nonlinear scaling includes shifting the data so that a median of the data is zero (0) and using an inverse hyperbolic sine function, which approximates a symmetric log-transform. Another example of nonlinear scaling is using a power transform, such as a box-cox transform.

In some implementations, a denoising setting may indicate a particular denoising process that is to be used, if any, for each feature of the historical sensor data 264. In some implementations, different denoising processes can be used for different features. Additionally, or alternatively, denoising can be applied to some features and not to other features. One example of a denoising process that can be used is Savitzky-Golay filtering.

In some implementations, one or more aggregation window settings indicate parameters of an aggregation window to be used for risk score and/or feature importance value calculation. For example, the aggregation window setting(s) may include a window size setting indicating a number of samples or a time duration to be represented by a window of samples used to calculate a risk score and/or a feature importance value. The aggregation window setting(s) may also, or in the alternative, include a window stride setting indicating how often a risk score or feature importance value is generated (e.g., as a multiple of a data sampling rate of the input data).

In FIG. 9, the preprocessor 104 processes the historical sensor data 264 to add data (e.g., to impute values), to remove data (e.g., to denoise values of a feature or to remove particular feature values from consideration), to modify data (e.g., to scale feature values), or a combination thereof. In some implementations, the particular operations performed by the preprocessor 104 are based on the configurable settings. In some implementations, the configurable settings are determined automatically and may be changed based on output of a model selector 912, as discussed further below.

The preprocessor 104 provides preprocessed historical sensor data to a data separator 902. The data separator 902 is configured to filter the preprocessed historical sensor data to generate filtered operation data 904. The filtered operational data 904 includes a subset of the preprocessed historical sensor data, and each sample period represented in the training data corresponds to a period when the monitored asset(s) appear to be operating normally.

The filtered operation data 904 is provided as input to a model generator 906. The model generator 906 is configured to generate training data (e.g., by further filtering the filtered operation data) and to train one or more models (e.g., one or more of the behavior models 502 or the behavior models 552 of FIG. 5). As a particular example, the model generator 906 may generate and/or train one or more of an autoencoder 520, a time series predictor 522, a feature predictor 524, or another behavior model. In this example, generating a model includes changing a structure (e.g., architecture) or other hyperparameters of the model, and training the model includes changing link weights, biases, or both, without changing the structure of the model.

In particular implementations, the model generator 906 uses an optimization training technique (such as backpropagation, derivative free optimization, or an extreme learning machine) to train one or more models. For example, the model generator 906 may train a single model that has a specified architecture (e.g., a default architecture). In this example, the training can use training data based on the filtered operation data 904 and the optimization training technique to adjust link weights of the model to generate a trained model. In another example, the model generator 906 trains multiple models with different specified architecture (e.g., multiple default architectures). In this example, each of the models is trained using the training data and the optimization training technique to adjust link weights of the model to generate a set of multiple trained models. In yet another example, the model generator 906 generates one or more models by specifying or evolving an architecture of each model. In this example, each of the models may be trained using the training data and the optimization training technique, and the model generator 906 may modify the architecture of one or more of the models iteratively until a termination condition is satisfied.

After training one or more models, the model(s) may be validated by a model validator 910. The model validator 910 is configured to use mixed operation data 908 from the data separator 902 to determine whether each of the model(s) is able to distinguish normal operational behavior from abnormal operational behavior with sufficient reliability. In this context, sufficient reliability is determined based on specified reliability criteria, such as a false positive rate, a false negative rate, an accurate detection rate, or other metrics indicative of reliability of a model. Accordingly, the mixed operation data 908 includes data representing both normal and abnormal operation based on the historical sensor data 264.

In some implementations, a model that is sufficiently reliable is passed directly to deployment 914 where it can be used to monitor one or more assets to detect anomalous operation. In some implementations, after validation by the model validator 910 one or more models may be scored or ranked by a model selector 912 to determine which, if any, of the models is to be passed to deployment 914. In such implementations, if a particular model is not selected for deployment 914 by the model selector 912, the model selector 912 may instruct the model generator 906 to modify the model, to train the model further (e.g., using optimization training) or to generate and train a new model (e.g., using automated model building and optimization training).

In some implementations, if a particular model is not selected for deployment 914 by the model selector 912, the model selector 912 may instruct the preprocessor 104 to use different settings to generate training and validation data (e.g., the filtered operation data 904 and the mixed operation data 908, respectively) used by the model generator 906 and the model validator 910, and a new set of one or more models may be generated and/or trained based on the new training and validation data. For example, the preprocessor 104 may select a different subset of features of the historical sensor data 264 for inclusion in the training and validation data (e.g., by adjusting the input data setting described above). As another example, the preprocessor 104 may select a different set of features to be used to produce residual data (e.g., by adjusting the output data setting described above). In other examples, others of the settings described above are adjusted.

In some implementations, preprocessing, data separation, model training, model validation, model selection, or a subset thereof, may be repeated iteratively until a termination condition is satisfied. For example, the termination condition may be satisfied when the model selector 912 determines that one or more models meet the termination condition. In a particular implementation, a determination of whether a model satisfies the termination condition is based on a score determined for the model. In some implementations, different metrics are available to determine a score for each model and the particular metric(s) used depends on associated with the model selector 912.

In a particular aspect, the model selector 912 uses one or more metrics to score the model(s). Metrics to score models generally account for how well a model is able to correctly identify alert conditions in a data set. For purposes of model scoring, each model may be provided input data from a data set that includes data associated with one or more alert conditions and that includes labels indicating the beginning and ending of each alert condition. Put another way, the data set is labeled (such as by a subject matter expert) with ground truth information indicating which data correspond to alert conditions and which do not. A model scoring metric may consider various types of alert indications generated by a model based on the data set, such as: true positive (TP) alert indications, false positive (FP) alert indications, true negative (TN) alert indications, false negative (FN) alert indications, or a combination thereof. In general, a TP alert indication occurs when the model generates an alert indication for a sequence of data (e.g., a particular time range of the data set) that corresponds to an alert condition, a FP alert indication occurs when the model generates an alert indication for a sequence of data (e.g., a particular time range of the data set) that does not correspond to an alert condition, a TN alert indication occurs when the model does not generate an alert indication for a sequence of data (e.g., a particular time range of the data set) that does not correspond to an alert condition, and a FN alert indication occurs when the model does not generate an alert indication for a sequence of data (e.g., a particular time range of the data set) that corresponds to an alert condition. More detailed definitions of TP-, FP-, TN-, and FN-alert indications may take into account temporal relationships between alert conditions and alert indications, feature importance information, or other factors. Various metrics that may be used to score models by accounting for one or more of these alert indication types are described below.

In some implementations, alert recall may be used, alone or in combination with one or more other metrics, to score the model(s). Alert recall may be measured as a ratio of the number of TP alert indications and the total number of actual alert conditions represented in the data set (e.g., TP alert indications+FN alert indications) provided to the model.

In some implementations, alert precision may be used, alone or in combination with one or more other metrics, to score the models. Alert precision may be measured as a ratio of the number of TP alert indications over the total number alert indications (e.g., TP alert indications+FP alert indications) generated by the model for the data set One example of a metric that uses both alert recall and alert precision is an $F_\beta$-score. An $F_\beta$-score may be determined as:

$$F_\beta \text{ score} = (1 + \beta^2) \times \frac{\text{alert precision} \times \text{alert recall}}{\beta^2 \times \text{alert precision} + \text{alert recall}}$$

where $\beta$ is a configurable parameter that can be adjusted to give more weight to alert precision or to alert recall.

In some implementations, a metric used for model scoring uses a configurable parameter to weight penalties applied to a model's model score for various performance criteria that a particular user (e.g., an owner or operator of a monitored system) is seeking to emphasize. As one example, a metric can apply a weighting factor to penalize a model missing alert conditions and/or for generating too many alert indications. To illustrate, a metric can be calculated as:

$$\text{metric} = c \times n_{missed}/n_{events} + n_{alerts}$$

where c is a value of the weighting factor (which is a configurable parameter), $n_{missed}$ is the number of alert conditions represented in a data set that the model missed (e.g., the number of FN alert indications), $n_{events}$ is the total number of alert conditions represented in the data set (e.g., the number of FN alert indications plus the number of TP alert indications), and $n_{alerts}$ is the number of alerts generated by the model for the data set (e.g., the number of TP and FP alert indications). In this illustrative example, a smaller value of the metric corresponds to a better model. Large values of c penalize the model more heavily for missing alert conditions (e.g., FN alert indications).

In a particular aspect, if a data set being used for model scoring does not include any alert conditions, the metric above can be modified such at the model is penalized for each alert indication generated above some allowable threshold (e.g., an FP threshold). To illustrate, when the data set does not include any true alert conditions, the metric above can be modified to:

$$\text{metric} = \max(0, n_{alerts} - \text{FP threshold})$$

where the FP threshold is a configurable parameter.

One benefit of the metric above is that it can be difficult and time consuming to distinguish FP and TP alert indications. Making this distinction may require examination of the data set by a subject matter expert. However, using the metric above, there is no need to make the distinction between FP and TP alert indications. Rather, the metric penalizes the model (by a weighted amount) for all alerts as represented by the $n_{alerts}$ value.

Alert recall, alert precision, $F_\beta$-scores, and other similar metrics based on the alert indication types listed above fail to fully capture certain aspects of model characterization that may be useful to score when evaluating a predictive maintenance model. For example, real-world alert conditions generally exist for a particular period of time, which introduces temporal considerations to model scoring. To illustrate, a real-world data set for a one-year period may include data representing three periods during which actual alert conditions existed. In this illustrative example, the first alert condition may be for a 1-minute period, the second alert condition may be for a 1-hour period, and the third alert condition may be for a 3-day period. Metrics that are based primarily or entirely on TP-, FP-, TN-, and FN-alert conditions may treat each of these alert conditions equally. Thus, a model that correctly detects the first alert condition and misses the second and third alert conditions may have a score equal to a model that correctly detects the third alert condition and misses the first and second alert conditions. However, for preventative maintenance purposes, it is likely the case that correctly predicting the third alert condition is much more important than correctly predicting the first alert condition.

As another example, two models that each correctly generate an alert indication associated with the third alert condition and miss the first and second alert condition may receive the same model score using the techniques described above; however, these two models may have very different utility for preventative maintenance purposes. To illustrate, a first of the two models may correctly predict the third alert condition 5-seconds before onset of the third alert condition and a second of the two models may correctly predict the third alert condition 3-hours before onset of the third alert condition. In this illustrative example, the second model is likely more useful for preventive maintenance since it provides a longer lead time to correct underlying conditions leading to the alert.

One example of a model scoring metric that accounts for temporal considerations is referred to herein as a ucf-score, which can be considered a harmonic mean of an $F_\beta$ score and a uc-value. The uc-value is a metric indicating a proportion of the time period represented by the data sample during which the model generates correct results (e.g., TP- or TN-alert indications). In a particular aspect, the uc-value may be determined as:

$$\text{uc\_value} = \frac{T + I - D_{FN} - D_{FP}}{T}$$

where T is the total scoring window duration (e.g., in minutes), I is a cumulative ideality score, $D_{FN}$ is a cumulative duration of false negatives (e.g., in minutes) during the scoring window, and $D_{FP}$ is a cumulative duration of false positives (e.g., in minutes) during the scoring window.

In a particular aspect, several configurable parameters can be used to determine the scoring window duration, the ideality score, the false negative duration, and the false positive duration. The configurable parameters include an ideal_start_lead_time (representing a maximum amount of time before the beginning of an alert condition when an ideal model would generate an alert indication) and an ideal_end_lead_time (representing a minimum amount of time before the beginning of an alert condition when an ideal model would generate an alert indication). In a particular implementation, the ideal_start_lead_time and the ideal_end_lead_time are user configurable parameters that estimate how much time an operator would need to react to a particular alert condition (e.g., to prevent the alert condition or to establish conditions that allow equipment to fail gracefully).

The configurable parameters may also include time-valued parameters like min_lead_time, max_lead_time, or others that constrain the beginning and ending of an alert, possibly with respect to an event. According to an aspect, an alert is considered to be a true positive for an event if the alert satisfies such constraints, where the constraints are expressed in terms of information about the alert and the event that is sufficient to determine whether the alert will make sense as a match to an operator, such as by occurring with enough lead time to give the operator sufficient time to respond and by occurring close enough to an event to be meaningfully associated with the event. Information associated with such constraints may include, without limitation, event start and end times, alert start and end times, and feature importances. An alert is considered a true positive if it is a true positive for any event.

Based on the configurable parameters, an ideality score value can be assigned to each TP alert indication. For example, without limitation, an alert indication may be considered to be a TP alert indication if the model generates an alert indication at least some configurable time before a period (in a data set-based time domain) during which an alert condition was present in the data, and if the alert indication continues past that configurable point in time. To illustrate, if a min_lead_time is specified, a TP alert indication may correspond to an alert indication where alert_start_time<event_start_time−min_lead_time<=alert_end_time, where alert_start_time corresponds to a timestamp of when (in the data set-based time domain) the model generated an alert indication for an alert condition represented in the data set; event_start_time corresponds to a timestamp of a start (e.g., a beginning) of the alert condition; and alert_end_time corresponds to a timestamp of when the model ceased generation of the alert indication (or indicated an end of the alert indication) for the alert condition represented in the data set.

For a TP alert indication, the ideality score can be determined using logic described below, in which alert_start_ideality_time=event_end_time−ideal_start_lead_time and alert_end_ideality_time=event_end_time−ideal_end_lead_time:

If alert_start_ideality_time<=alert_start_time<=alert_end_ideality_time then ideality=0;

Elseif alert_start_time>alert_end_ideality_time then ideality=alert_end_ideality_time−alert_start_time;

Elseif alert_start_time<alert_start_ideality_time then ideality=alert_start_time−alert_start_ideality_time.

Note that based on the logic above, each ideality value is 0 or a negative number indicating a duration (e.g., minutes) of deviation from ideal values specified by the configurable parameters. The ideality values of the TP alert indications generated by a model are summed to generate the cumulative ideality score (I) used for the uc_value calculation.

If the model generates an alert that does not meet the criteria to be a TP alert indication (e.g., does not meet alert_start_time<event_start_time−min_lead_time<=alert_end_time) for at least one event, that alert indication is considered a FP alert indication and is used to determine a false positive duration value. In a particular aspect, each false positive duration value may be determined as:

FP_duration=alert_end_time−alert_start_time

The false positive duration values during the scoring window duration are summed to generate the cumulative duration of false positives ($D_{FP}$) used for the uc_value calculation.

If the model fails to generate an alert indication when an alert condition is present, the duration of the alert condition is used as an FN duration associated with the alert condition. To illustrate, the FN duration for a particular missed alert condition may be determined as:

FN_duration=event_end_time−event_start_time

The FN durations for alert conditions that are missed during the scoring window are summed to generate the cumulative duration of false negatives ($D_{FN}$) used for the uc_value calculation.

As described above, in some implementations, the ucf-score for a particular model may be determined based on a harmonic mean of an $F_\beta$ score for the particular model and a uc-value for the particular model. In such implementations, the configurable parameters may also include a $\beta$ value for the $F_\beta$ score and a weighting parameter for weighting the $F_\beta$ score and the uc-value to calculate the harmonic mean.

In some implementations, a metric for model scoring takes into account how well feature importance data generated by the model matches expected feature importance values associated with various alert conditions represented in a data set used for model scoring. To facilitate scoring a model based on feature importance values, a subject matter expert may associate expected feature labels with alert conditions represented in a data set. The model being scored may be provided the data set, or portions thereof, in order to generate alert indications and feature importance data. The alert indications generated by the model are compared to the labeled data set to assign a model score. In some implementations, a model score based on feature importance data can be used with, or combined with, one or more other model scores, such as a model score based on alert recall, alert precision, $F_\beta$-scores, alert indication types (e.g., TP-, FP-, TN-, and FN-alert conditions), temporal considerations, or a combination thereof.

In a particular aspect, a feature importance-based metric is based on a feature match score. The feature match score indicates how well feature importance data generated by the model matches expected feature importance data. Since expected feature importance data is only associated with actual alert conditions, the feature match score may be calculated only for TP alert indications (e.g., for alert indications that correspond to alert conditions in the labeled data set). Various mechanisms can be used to determine whether an alert indication corresponds to a particular alert condition. For example, an alert indication that starts after an alert condition starts and ends before the alert condition ends can be considered to correspond to the alert condition. In this example, a time period associated with the alert indication is fully bounded by a time period associated with the alert condition. As another example, an alert indication that starts after an alert condition starts or ends before the alert condition ends can be considered to correspond to the alert condition. In this example, the time period associated with the alert indication overlaps the time period associated with the alert condition. A feature match score may be calculated for each alert indication generated by the model that corresponds to an alert condition in the data set.

As one example, the feature match score is based on the feature importance value assigned to each feature (e.g., a numerical value assigned by the first feature importance calculator 114 of FIG. 1). In this example, the labels assigned to the data set indicate expected feature importance values, and the feature match score is indicative of how well the model assigned feature importance values match the expected feature importance values. In a particular aspect, a single feature match score is calculated for each alert condition timestamp of the data set based on the set of feature importance values assigned by the model. To illustrate, the model assigned feature importance values may be aggregated (e.g., summed through time) and normalized based on a representative range of expected feature importance values to generate the single feature match score for an alert condition. As another example, the feature match score is based on feature importance ranking of the features (e.g., a relative importance ranking based on the feature importance values). In this example, the labels assigned to the data set indicate expected feature importance rankings, and the feature match score is indicative of how well the model ranked the feature importance of the features. In a particular aspect, a single feature match score is calculated for the model based on the set of feature importance ranks assigned by the model. To illustrate, the model assigned feature importance ranks may be aggregated (e.g., summed through time) and normalized based on a representative range of expected feature importance ranks to generate the single feature match score for the model).

In a particular aspect, one alert indication generated by the model may align in time with more than one alert condition in the data set. In this situation, the alert indication may be assigned to a single alert condition. To illustrate, the alert indication may be associated with the alert condition with which it has the largest feature match score.

Additionally, or alternatively, one alert condition in the data set may align in time with more than one alert indication generated by the model. In this situation, a single alert indication may be assigned to the alert condition. To illustrate, the alert condition may be associated with the alert indication with the largest feature match score for the alert condition. Alternatively, since more than one alert indication may legitimately align with a particular alert condition, the feature match scores of alert indications that match the alert condition may be aggregated. For example, a maximum, minimum, average, or weighted average of the feature match scores can be used.

After determining a feature match score for each alert indication, alert-domain recall and alert-domain precision can be calculated. In a particular aspect, alert-domain recall indicates a fraction of alert conditions detected based on feature match scores, where each feature match score has a value between 0 and 1 indicating how well the feature importance data associated with the alert indication matches the expected feature importance values associated with the alert condition. In some implementations, weighting values may be assigned to the alert conditions in the data set (e.g., to indicate which alert conditions a subject matter expert considers to be more important for the model to detect), and the alert-domain recall can be calculated based on the weighting values. For example, the alert-domain recall can be calculated as:

$$\text{recall} = \frac{1}{\sum_{e \in events} w_e} \times \sum_{e \in events} w_e \times \text{FM\_score}(e)$$

where $w_e$ is a weight value assigned to a particular event (i.e., a particular alert condition of the data set) and FM_score(e) is the feature match score for the particular event e. If more than one alert indication is associated with a particular alert condition, a representative feature match score can be used for FM_score(e). For example, the FM_score(e) value for a particular alert condition may be the maximum feature match score associated with the alert condition.

In a particular aspect, alert-domain precision indicates a fraction of alert indications that are TP alert indications based on the feature match scores, where each feature match score has a value between 0 and 1 indicating how well the feature importance data associated with the alert indication matches the expected feature importance values associated with the alert condition. For example, the alert-domain precision can be calculated as:

$$\text{precision} = \frac{1}{\text{num\_alerts}} \times \sum_{a \in alerts} \text{FM\_score}(a)$$

where num_alerts is a count of the number of alert indications (e.g., alerts) generated by the model during a scoring window and FM_score(a) is the feature match score for a particular alert a. If more than one feature match score is associated with an alert indication, a representative feature match score can be used for FM_score(a). For example, the FM_score(a) value for a particular alert indication may be the maximum feature match score associated with the alert indication.

In some implementations, the model score for a particular model corresponds to an alert-domain $F_\beta$ score, where the alert-domain $F_\beta$ score is determined based on the alert-domain recall and the alert-domain precision. In other implementations, the model score for a particular model is based on the alert-domain $F_\beta$ score in combination with one or more other metrics, such as a risk-domain $F_\beta$ score. For example, the alert-domain $F_\beta$ score and a risk-domain $F_\beta$ score can be combined to generate the model score as follows:

$$\text{model\_score} = \frac{\alpha \times F_{\beta,alert} + F_{\beta,risk}}{1 + \alpha}$$

where $F_{\beta,alert}$ is the alert-domain $F_P$ score, $F_{\beta,risk}$ the risk-domain $F_\beta$ score, and $\alpha$ is a weighting factor. In a particular implementation, is the risk-domain $F_\beta$ score is determined based on risk indices associated with TP-, FN-, and FP-alert indications. The risk indices correspond to timestamps at which the model makes predictions. For example, the model may indicate an alert at times t1, t2, t3 and at times t10-t20, representing alert indications for two alert conditions (e.g., a first alert condition from time t1-t3 and a second alert condition from t10-t20. If the true alert condition is from t5-t15, then: t1-t3 risk indices are false positives (FP), t5-t9 are false negatives (FN), t10-t15 are true positives (TP) and t16-t20 are false positives (FP). The risk-domain $F_\beta$ score can be calculated from the number of TP, FN, and FP risk indices (in this case, 6, 5, and 8 respectively).

Figure 10:
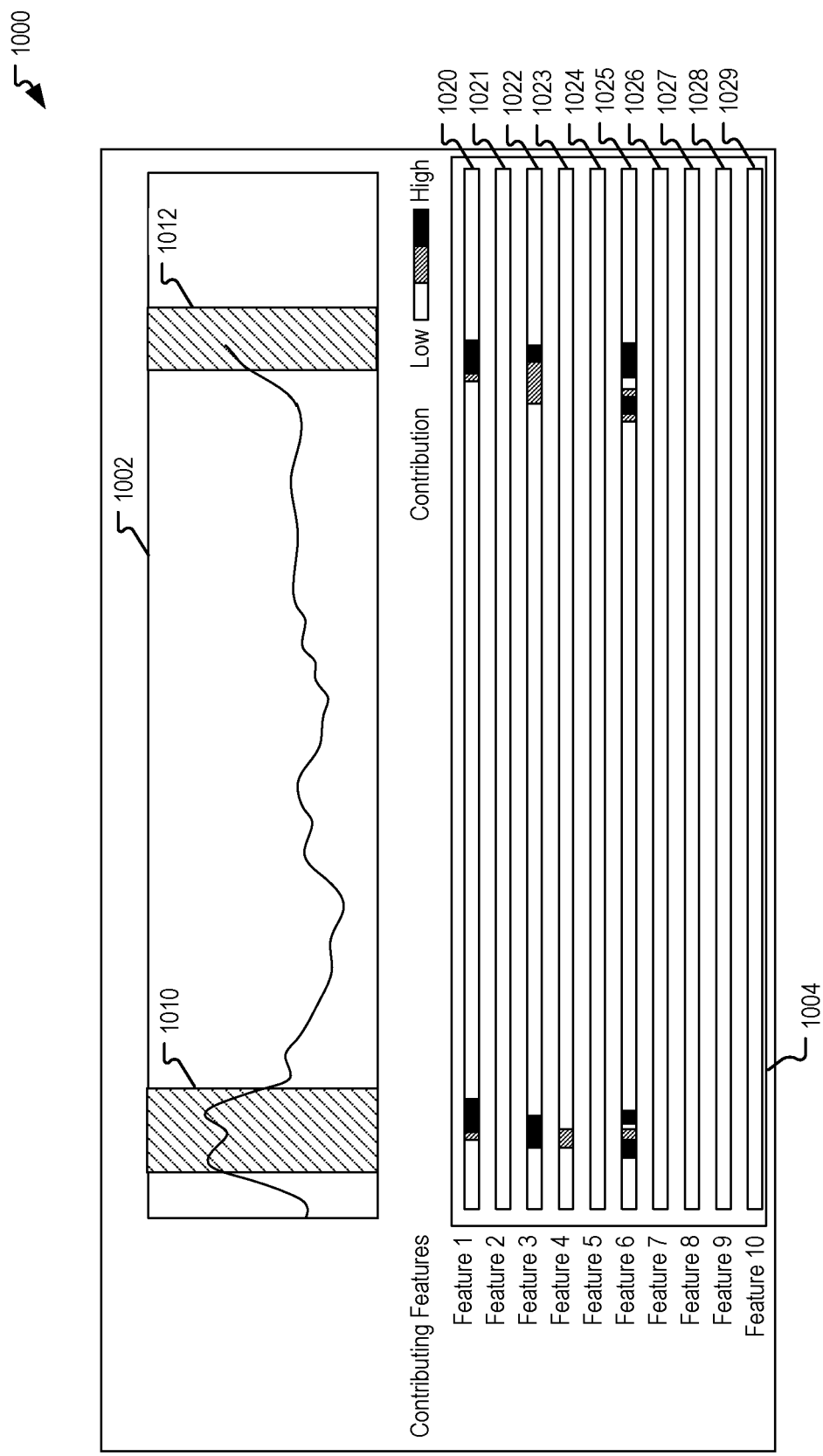
FIG. 10 is a depiction of a graphical user interface that may be generated by the system of FIG. 2 in accordance with some examples of the present disclosure.

FIG. 10 depicts an example of a graphical user interface 1000, such as the graphical user interface 266 of FIG. 2. The graphical user interface 1000 includes a chart 1002 that illustrates values of an anomaly metric (e.g., the first output 244 and the second output 254) over a time period. As illustrated, the chart 1002 also includes a first alert indication 1010 and a second alert indication 1012, indicating time periods during which the anomaly metric deviated sufficiently from "normal" behavior of the anomaly metric to generate an alert, such as the alert 230. In some implementations, the graphical user interface 1000 also includes, for each alert indication, an indication of which anomaly detection model exhibited the abnormal behavior associated with that alert indication, such as by displaying an indication of which component(s) and/or domain(s) of the monitored device 204 is associated with each of the alert indications 1010 and 1012.

The graphical user interface 1000 also includes an indication 1004 of one or more sets of feature importance data associated with the first alert indication 1010 and the second alert indication 1012. For example, a first indicator 1020 extends horizontally under the chart 1002 and has different visual characteristics (depicted as white, grey, or black) indicating the relative contributions of a first feature (of received sensor data 102 or first portion 310 of the input data 150) in determining to generate the first alert indication 1010 and the second alert indication 1012. Similarly, a second indicator 1021 indicates the relative contributions of a second feature in determining to generate the first alert indication 1010 and the second alert indication 1012. Indicators 1022-1029 indicate the relative contributions of third, fourth, fifth, sixth, seventh, eighth, ninth, and tenth features, respectively, in determining to generate the first alert indication 1010 and the second alert indication 1012. Although ten indicators 1020-1029 for ten features of the sensor data 102 (or of the input data 150) are illustrated, in other implementations fewer than ten features or more than ten features may be used.

For example, the first alert indication 1010 shows that the sixth features had a high contribution at a beginning of the first alert indication 1010, followed by high contributions of the first features and the third features, and a medium contribution of the fourth features. Providing relative contributions of each feature to an alert determination can assist a subject matter expert to diagnose an underlying cause of abnormal behavior, to determine a remedial action to perform responsive to the alert determination, or both.

Figure 11:
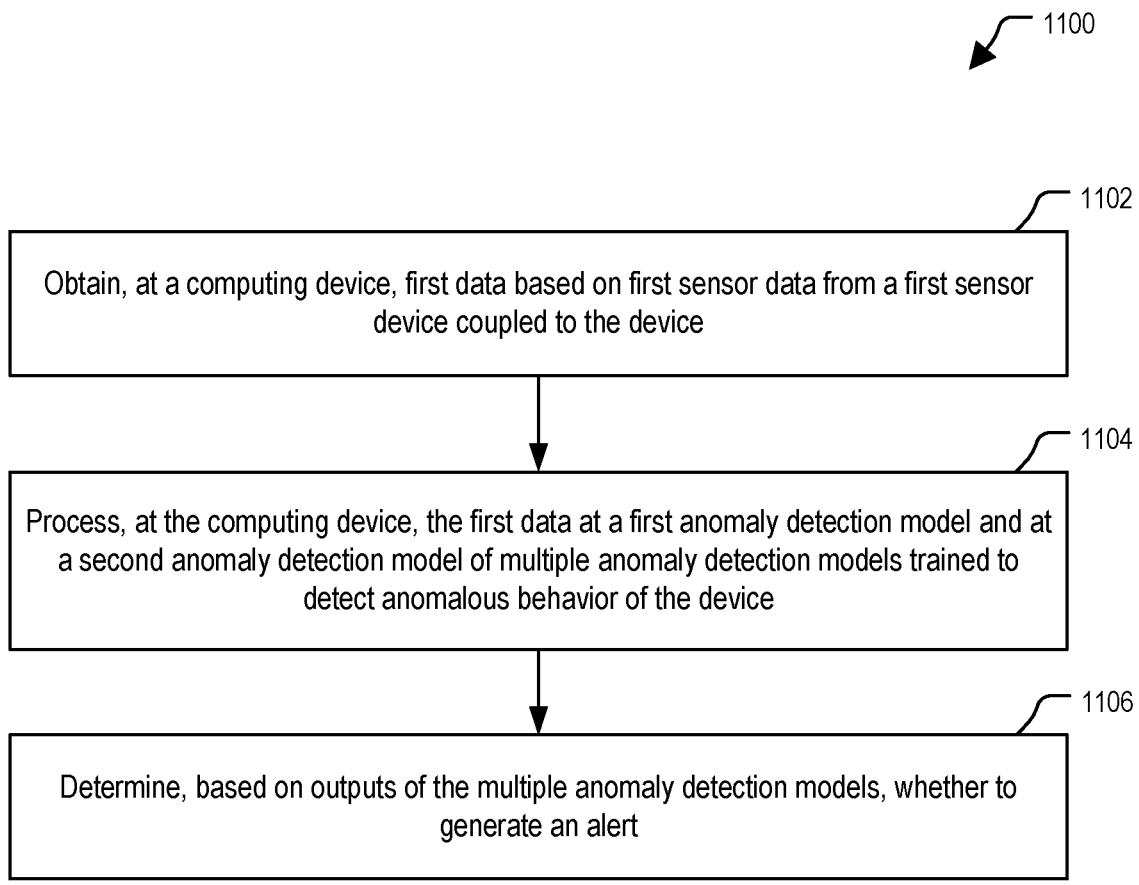
FIG. 11 is a flow chart of an example of a method of behavior monitoring that may be implemented by the system of FIG. 2.

FIG. 11 is a flow chart of a first example of a method 1100 of behavior monitoring that may be implemented by the system of FIG. 2. For example, one or more operations described with reference to FIG. 11 may be performed by the computing device 210, such as by the processor(s) 220 executing the instructions 262.

The method 1100 includes, at 1102, obtaining, at a computing device, first data based on first sensor data from a first sensor device coupled to the device. In an illustrative example, the computing device 210 of FIG. 2 obtains (e.g., generates at the preprocessor 104) the first data 152 based on the first sensor data 271 from the first sensor device 270 that is coupled to the monitored device 204.

The method 1100 includes, at 1104, processing, at the computing device, the first data at a first anomaly detection model and at a second anomaly detection model of multiple anomaly detection models trained to detect anomalous behavior of the device. In some implementations, the first anomaly detection model is trained to monitor a first aspect of operation of the device, and the second anomaly detection model is trained to monitor a second aspect of operation of the device, where the first aspect of operation of the device is different from the second aspect of operation of the device. For example, the computing device 210 processes the first data 152 at the first anomaly detection model 106 and at the second anomaly detection model 126. The first anomaly detection model 106 is trained to monitor the first aspect 242 of operation of the monitored device 204, and the second anomaly detection model 126 is trained to monitor the second aspect 252 of operation of the monitored device 204. In some implementations, processing the first data at the first anomaly detection model includes generating a first residual of a first autoencoder, such as the residual 521 of the autoencoder 520 of FIG. 5, and processing the first data at the second anomaly detection model includes generating a second residual of a second autoencoder, such as the residual 571 of the autoencoder 570.

The method 1100 includes, at 1106, determining, based on outputs of the multiple anomaly detection models, whether to generate an alert. For example, the alert generation model 140 processes the outputs 226 of the multiple anomaly detection models 224 to determine whether to generate the alert 230. In some implementations, determining whether to generate the alert based on the outputs of the multiple anomaly detection models includes performing a logical operation on the outputs, such as the logical operation 602 of FIG. 6. In some implementations, determining whether to generate the alert based on the outputs of the multiple anomaly detection models includes processing the outputs at an alert aggregation model, such as the alert aggregation model 702 of FIG. 7. In some implementations, determining whether to generate the alert based on the outputs of the multiple anomaly detection models includes processing the outputs at a classifier, such as the classifier 802 of FIG. 8.

In some implementations, the method 1100 includes sending a control signal to the device based on the outputs of the multiple anomaly detection models, such as the control signal 292 of FIG. 2. In some implementations, the method 1100 includes scheduling a maintenance action for the device based on the outputs of the multiple anomaly detection models, such as the maintenance action(s) 294 of FIG. 2.

In some implementations, the first anomaly detection model is configured to monitor behavior of a first component of the device, and the second anomaly detection model is configured to monitor behavior of a second component of the device. For example, the first anomaly detection model 106 of FIG. 3 is configured to monitor behavior of the first component 302 of the monitored device 204, and the second anomaly detection model 126 is configured to monitor behavior of the second component 304 of the monitored device 204. In other implementations, the first anomaly detection model is configured to monitor a first physical system of the device, and the second anomaly detection model is configured to monitor a second physical system of the device. For example, the first anomaly detection model 106 of FIG. 4 is configured to monitor the first physical system 402 of the monitored device 204, and the second anomaly detection model 126 is configured to monitor the second physical system 404 of the monitored device 204.

According to some aspects, the first data is included in input data corresponding to sensor data from multiple sensor devices coupled to the device. The first anomaly detection model processes a first portion of the input data that includes the first data, the second anomaly detection model processes a second portion of the input data that includes the first data, and the first portion is distinct from the second portion. For example, as illustrated in FIG. 3 and FIG. 4, the first anomaly detection model 106 processes the first portion 310 of the input data 150 that includes the first data 152, and the second anomaly detection model 126 processes a second portion 312 of the input data 150 that includes the first data 152.

In some implementations, the method 1100 includes performing, at the first anomaly detection model, processing the first data to generate autoencoder input data and processing the autoencoder input data to generate one or more residuals indicative of an anomaly. For example, the processing unit 510 of the first anomaly detection model 106 of FIG. 5 processes the first data 152 to generate the autoencoder input data 512 (e.g., the second data 154 and the output of the processing unit 510), and the autoencoder 520 processes the autoencoder input data 512 to generate the residual 521.

In some implementations, the method 1100 includes determining, at each of the multiple anomaly detection models, a residual for that anomaly detection model, and the outputs include the residuals. For example, the first anomaly detection model 106 determines the first residuals data 108 and the second anomaly detection model 126 determines the second residuals data 128. In the example of FIG. 5, the first residuals data 108 can be included in the first output 244 and the second residuals data 128 can be included in the second output 254.

In some implementations, the method 1100 includes determining, at each of the multiple anomaly detection models, whether to generate an alert indication as an output for that anomaly detection model. For example, the alert generation model 508 of the first anomaly detection model 106 of FIG. 5 determines whether to generate the alert indication 540 as an output for first anomaly detection model 106, and the alert generation model 558 determines whether to generate the alert indication 590 as an output for second anomaly detection model 126.

Figure 12:
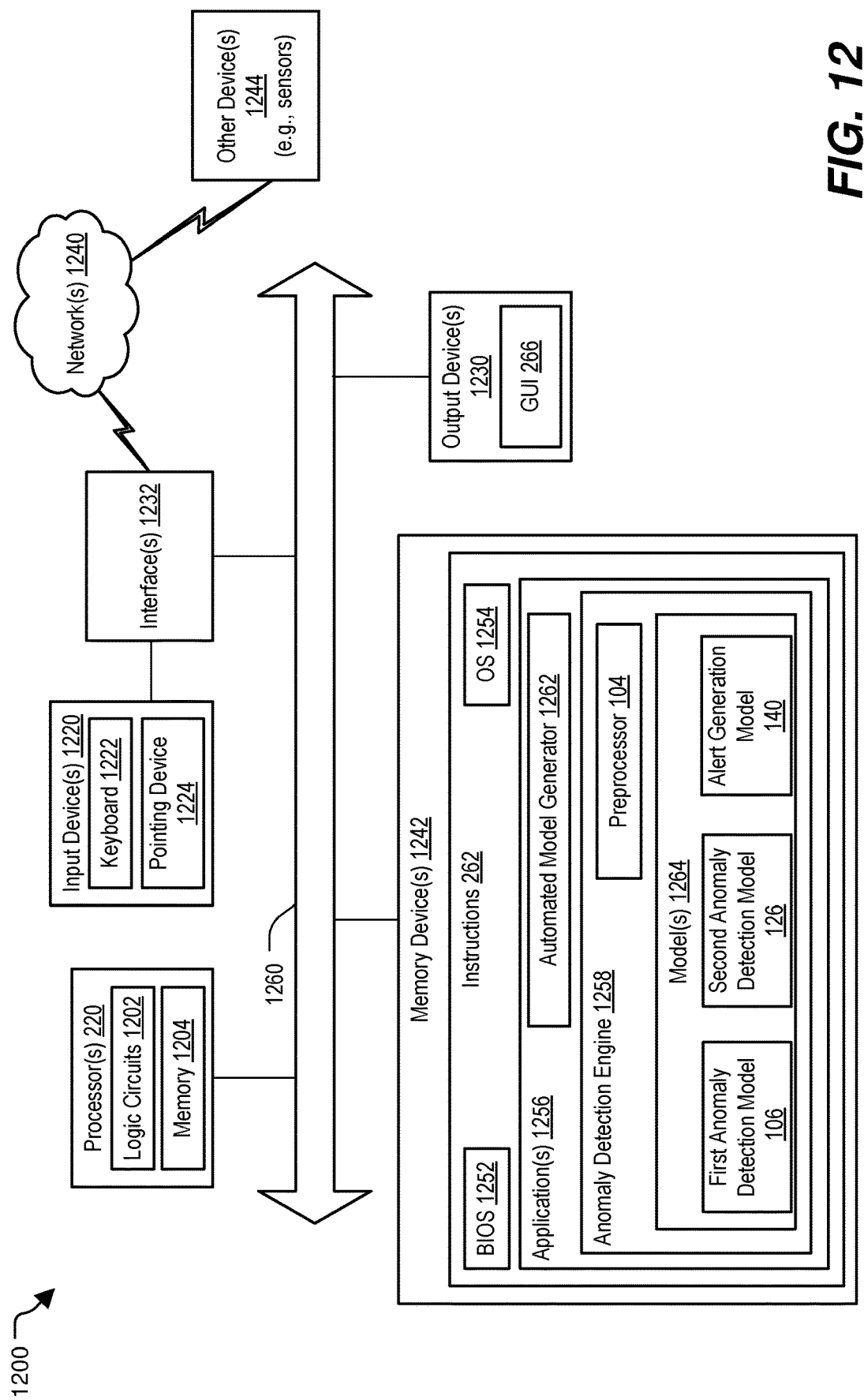
FIG. 12 illustrates an example of a computer system corresponding to, including, or included within the system of FIG. 2 according to particular implementations.

FIG. 12 illustrates an example of a computer system 1200 corresponding to one or more of the systems of FIG. 2, 3, or 4 according to particular implementations. For example, the computer system 1200 is configured to initiate, perform, or control one or more of the operations described with reference to FIG. 1, 9, or 11. The computer system 1200 can be implemented as or incorporated into one or more of various other devices, such as a personal computer (PC), a tablet PC, a server computer, a personal digital assistant (PDA), a laptop computer, a desktop computer, a communications device, a wireless telephone, or any other machine capable of executing a set of instructions (sequential or otherwise) that specify actions to be taken by that machine. Further, while a single computer system 1200 is illustrated, the term "system" includes any collection of systems or sub-systems that individually or jointly execute a set, or multiple sets, of instructions to perform one or more computer functions.

While FIG. 12 illustrates one example of the computer system 1200, other computer systems or computing architectures and configurations may be used for carrying out the automated model generation or asset monitoring operations disclosed herein. The computer system 1200 includes the one or more processors 220. Each processor of the one or more processors 220 can include a single processing core or multiple processing cores that operate sequentially, in parallel, or sequentially at times and in parallel at other times. Each processor of the one or more processors 220 includes circuitry defining a plurality of logic circuits 1202, working memory 1204 (e.g., registers and cache memory), communication circuits, etc., which together enable the processor(s) 220 to control the operations performed by the computer system 1200 and enable the processor(s) 220 to generate a useful result based on analysis of particular data and execution of specific instructions.

The processor(s) 220 are configured to interact with other components or subsystems of the computer system 1200 via a bus 1260. The bus 1260 is illustrative of any interconnection scheme serving to link the subsystems of the computer system 1200, external subsystems or devices, or any combination thereof. The bus 1260 includes a plurality of conductors to facilitate communication of electrical and/or electromagnetic signals between the components or subsystems of the computer system 1200. Additionally, the bus 1260 includes one or more bus controllers or other circuits (e.g., transmitters and receivers) that manage signaling via the plurality of conductors and that cause signals sent via the plurality of conductors to conform to particular communication protocols.

The computer system 1200 also includes the one or more memory devices 1242, such as the memory 214. The memory device(s) 1242 include any suitable computer-readable storage device depending on, for example, whether data access needs to be bi-directional or unidirectional, speed of data access required, memory capacity required, other factors related to data access, or any combination thereof. Generally, the memory device(s) 1242 includes some combinations of volatile memory devices and non-volatile memory devices, though in some implementations, only one or the other may be present. Examples of volatile memory devices and circuits include registers, caches, latches, many types of random-access memory (RAM), such as dynamic random-access memory (DRAM), etc. Examples of non-volatile memory devices and circuits include hard disks, optical disks, flash memory, and certain type of RAM, such as resistive random-access memory (ReRAM). Other examples of both volatile and non-volatile memory devices can be used as well, or in the alternative, so long as such memory devices store information in a physical, tangible medium. Thus, the memory device(s) 1242 include circuits and structures and are not merely signals or other transitory phenomena (i.e., are non-transitory media).

In the example illustrated in FIG. 12, the memory device(s) 1242 store the instructions 262 that are executable by the processor(s) 220 to perform various operations and functions. The instructions 262 include instructions to enable the various components and subsystems of the computer system 1200 to operate, interact with one another, and interact with a user, such as a basic input/output system (BIOS) 1252 and an operating system (OS) 1254. Additionally, the instructions 262 include one or more applications 1256, scripts, or other program code to enable the processor(s) 220 to perform the operations described herein. For example, in FIG. 12, the instructions 262 include automated model building instructions 1262 configured to initiate, control, or perform one or more model generation or model training operations described with reference to FIG. 9. Additionally, in the example of FIG. 12, the instructions 262 include an anomaly detection engine 1258 that is configured to monitor sensor data to determine whether a monitored asset is performing abnormally. In FIG. 12, the anomaly detection engine 1058 uses one or more models 1264 to monitor the sensor data. To illustrate, the anomaly detection engine 1058 uses the first anomaly detection model 106, the second anomaly detection model 126, the alert generation model 140, or a combination thereof. Additionally, the anomaly detection engine 1058 uses the preprocessor 104 to preprocess the sensor data before providing the sensor data to one or more of the model(s) 1264. In a particular implementation, the instructions 262 are executable by the processor(s) 220 to perform one or more (or all) elements of the method 1100 of FIG. 11.

In FIG. 12, the computer system 1200 also includes one or more output devices 1230, one or more input devices 1220, and one or more interface devices 1232. Each of the output device(s) 1230, the input device(s) 1220, and the interface device(s) 1232 can be coupled to the bus 1260 via a port or connector, such as a Universal Serial Bus port, a digital visual interface (DVI) port, a serial ATA (SATA) port, a small computer system interface (SCSI) port, a high-definition media interface (HDMI) port, or another serial or parallel port. In some implementations, one or more of the output device(s) 1230, the input device(s) 1220, the interface device(s) 1232 is coupled to or integrated within a housing with the processor(s) 220 and the memory device(s) 1242, in which case the connections to the bus 1260 can be internal, such as via an expansion slot or other card-to-card connector. In other implementations, the processor(s) 220 and the memory device(s) 1242 are integrated within a housing that includes one or more external ports, and one or more of the output device(s) 1230, the input device(s) 1220, or the interface device(s) 1232 is coupled to the bus 1260 via the external port(s).

Examples of the output device(s) 1230 include display devices (e.g., the display device 208 of FIG. 2), speakers, printers, televisions, projectors, or other devices to provide output of data in a manner that is perceptible by a user. Examples of the input device(s) 1220 include buttons, switches, knobs, a keyboard 1222, a pointing device 1224, a biometric device, a microphone, a motion sensor, or another device to detect user input actions. The pointing device 1224 includes, for example, one or more of a mouse, a stylus, a track ball, a pen, a touch pad, a touch screen, a tablet, another device that is useful for interacting with a graphical user interface, or any combination thereof. A particular device may be an input device 1220 and an output device 1230. For example, the particular device may be a touch screen.

The interface device(s) 1232 are configured to enable the computer system 1200 to communicate with one or more other devices 1244 directly or via one or more networks 1240. For example, the interface device(s) 1232 may encode data in electrical and/or electromagnetic signals that are transmitted to the other device(s) 1244 as control signals or packet-based communication using pre-defined communication protocols. As another example, the interface device(s) 1232 may receive and decode electrical and/or electromagnetic signals that are transmitted by the other device(s) 1244. To illustrate, the other device(s) 1244 may include the sensor devices 206 of FIG. 2. The electrical and/or electromagnetic signals can be transmitted wirelessly (e.g., via propagation through free space), via one or more wires, cables, optical fibers, or via a combination of wired and wireless transmission.

In an alternative embodiment, dedicated hardware implementations, such as application specific integrated circuits, programmable logic arrays and other hardware devices, can be constructed to implement one or more of the operations described herein. Accordingly, the present disclosure encompasses software, firmware, and hardware implementations.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module or a decision model may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of a block diagrams and flowchart illustration, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In conjunction with the described devices and techniques, an apparatus for detecting anomalous operation of a monitored asset includes means for obtaining first data based on first sensor data from a first sensor device coupled to the monitored asset. For example, the means for obtaining the first data can correspond to the receiver 218, the processor(s) 220, the preprocessor 104, one or more other circuits or devices to receive, generate, or otherwise obtain first data based on sensor data from the first sensor device, or any combination thereof.

The apparatus includes means for processing the first data at a first anomaly detection model and at a second anomaly detection model of multiple anomaly detection models trained to detect anomalous behavior of the monitored asset. For example, the means for processing the first data can correspond to the first anomaly detection model 106, the second anomaly detection model 126, the processor(s) 220, one or more other circuits or devices to process the first data at multiple behavior models, or any combination thereof.

The apparatus also includes means for determining, based on outputs of the multiple anomaly detection models, whether to generate an alert. For example, the means for determining whether to generate an alert can correspond to the alert generation model 140, the processor(s) 220, one or more other circuits or devices to determine whether to generate an alert, or any combination thereof.

Particular aspects of the disclosure are described below in the following examples:

According to Example 1, a method of monitoring behavior of a device includes: obtaining, at a computing device, first data based on first sensor data from a first sensor device coupled to the device; processing, at the computing device, the first data at a first anomaly detection model and at a second anomaly detection model of multiple anomaly detection models trained to detect anomalous behavior of the device; and determining, based on outputs of the multiple anomaly detection models, whether to generate an alert.

Example 2 includes the method of Example 1, wherein the first anomaly detection model is trained to monitor a first aspect of operation of the device and the second anomaly detection model is trained to monitor a second aspect of operation of the device, wherein the first aspect of operation of the device is different from the second aspect of operation of the device.

Example 3 includes the method of Example 2, wherein the first anomaly detection model is configured to monitor behavior of a first component of the device, and the second anomaly detection model is configured to monitor behavior of a second component of the device.

Example 4 includes the method of Example 2, wherein the first anomaly detection model is configured to monitor a first physical system of the device, and the second anomaly detection model is configured to monitor a second physical system of the device.

Example 5 includes the method of any of Example 1 to Example 4, wherein: the first data is included in input data corresponding to sensor data from multiple sensor devices coupled to the device; the first anomaly detection model processes a first portion of the input data that includes the first data; the second anomaly detection model processes a second portion of the input data that includes the first data; and the first portion is distinct from the second portion.

Example 6 includes the method of any of Example 1 to Example 5, further including performing, at the first anomaly detection model: processing the first data to generate autoencoder input data; and processing the autoencoder input data to generate one or more residuals indicative of an anomaly.

Example 7 includes the method of any of Example 1 to Example 6, further including determining, at each of the multiple anomaly detection models, whether to generate an alert indication as an output for that anomaly detection model.

Example 8 includes the method of any of Example 1 to Example 7, further including determining, at each of the multiple anomaly detection models, a residual for that anomaly detection model, and wherein the outputs include the residuals.

Example 9 includes the method of any of Example 1 to Example 8, wherein determining whether to generate the alert based on the outputs of the multiple anomaly detection models includes performing a logical operation on the outputs.

Example 10 includes the method of any of Example 1 to Example 8, wherein determining whether to generate the alert based on the outputs of the multiple anomaly detection models includes processing the outputs at an alert aggregation model.

Example 11 includes the method of any of Example 1 to Example 8, wherein determining whether to generate the alert based on the outputs of the multiple anomaly detection models includes processing the outputs at a classifier.

Example 12 includes the method of any of Example 1 to Example 11, further including sending a control signal to the device based on the outputs of the multiple anomaly detection models.

Example 13 includes the method of any of Example 1 to Example 12, further including scheduling a maintenance action for the device based on the outputs of the multiple anomaly detection models.

Example 14 includes the method of any of Example 1 to Example 13, wherein processing the first data at the first anomaly detection model includes generating a first residual of a first autoencoder, and wherein processing the first data at the second anomaly detection model includes generating a second residual of a second autoencoder.

According to Example 15, a device includes: a memory configured to store instructions; and a processor configured to execute the instructions to perform the method of any of Example 1 to Example 14.

According to Example 16, a computer-readable storage device stores instructions that when executed by one or more processors, cause the one or more processors to perform the method of any of Example 1 to Example 14.

According to Example 17, an apparatus comprises means for carrying out the method of any of Example 1 to Example 14.

According to Example 18, a computing device includes: one or more processors configured to: obtain first data based on first sensor data from a first sensor device coupled to a device; process the first data at a first anomaly detection model and at a second anomaly detection model of multiple anomaly detection models trained to detect anomalous behavior of the device; and determine, based on outputs of the multiple anomaly detection models, whether to generate an alert.

Example 19 includes the computing device of Example 18, wherein the first anomaly detection model is trained to monitor a first aspect of operation of the device and the second anomaly detection model is trained to monitor a second aspect of operation of the device, wherein the first aspect of operation of the device is different from the second aspect of operation of the device.

Example 20 includes the computing device of Example 19, wherein the first anomaly detection model is configured to monitor behavior of a first component of the device, and the second anomaly detection model is configured to monitor behavior of a second component of the device.

Example 21 includes the computing device of Example 19, wherein the first anomaly detection model is configured to monitor a first physical system of the device, and the second anomaly detection model is configured to monitor a second physical system of the device.

According to Example 22, a computer-readable storage device stores instructions that when executed by one or more processors, cause the one or more processors to: obtain first data based on first sensor data from a first sensor device coupled to a device; process the first data at a first anomaly detection model and at a second anomaly detection model of multiple anomaly detection models trained to detect anomalous behavior of the device; and determine, based on outputs of the multiple anomaly detection models, whether to generate an alert.

Example 23 includes the computer-readable storage device of Example 20, wherein the first data is included in input data corresponding to sensor data from multiple sensor devices coupled to the device, and wherein the instructions are executable to further cause the one or more processors to: process, at the first anomaly detection model, a first portion of the input data that includes the first data; and process, at the second anomaly detection model, a second portion of the input data that includes the first data and that is distinct from the first portion.

Although the disclosure may include one or more methods, it is contemplated that it may be embodied as computer program instructions on a tangible computer-readable medium, such as a magnetic or optical memory or a magnetic or optical disk/disc. All structural, chemical, and functional equivalents to the elements of the above-described aspects that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method of monitoring behavior of a device, the method comprising:
    obtaining, at a computing device, first data based on first sensor data from a first sensor device coupled to the device;
    processing, at the computing device, the first data at a first anomaly detection model of multiple anomaly detection models trained to detect anomalous behavior of the device, wherein processing the first data at the first anomaly detection model includes determining a first residual, the first residual determined based on an input of the first anomaly detection model and an output of the first anomaly detection model;
    processing, at the computing device, the first data at a second anomaly detection model of the multiple anomaly detection models;
    determining, at the computing device for each anomaly detection model of the multiple anomaly detection models, a corresponding residual for that anomaly detection model, wherein the corresponding residuals include the first residual; and
    determining, at the computing device based on outputs of the multiple anomaly detection models, whether to generate an alert identifying that a particular output of at least one of the multiple anomaly detection models is abnormal, wherein the outputs include each of the corresponding residuals.

2. The method of claim 1, wherein the first residual corresponds to a difference between the first data and first processed data.

3. The method of claim 1, wherein the first residual is generated by a first dimensional reduction model, a first autoencoder, a first time series predictor, a first feature predictor, or a combination thereof.

4. The method of claim 1, further comprising obtaining, at the computing device, second data from a second sensor distinct from the first sensor and third data from a third sensor distinct from the first sensor and the second sensor, wherein the second data is processed at the first anomaly detection model and the third data is processed at the second anomaly detection model.

5. The method of claim 1, wherein:
    the first data is included in input data corresponding to sensor data from multiple sensor devices coupled to the device;
    the first anomaly detection model processes a first portion of the input data that includes the first data;
    the second anomaly detection model processes a second portion of the input data that includes the first data; and
    the first portion is distinct from the second portion.

6. The method of claim 1, further comprising performing, at the first anomaly detection model:
    processing the first data to generate autoencoder input data; and
    processing the autoencoder input data to generate one or more residuals indicative of an anomaly, wherein the one or more residuals include the first residual.

7. The method of claim 1, further comprising determining, at each of the multiple anomaly detection models, whether to generate an alert indication as an output for that anomaly detection model.

8. The method of claim 1, wherein the first residual corresponds to a first difference between the input of the first anomaly detection model and the output of the first anomaly detection model, and wherein a second residual corresponds to a difference between a second input of the second anomaly detection model and a second output of the second anomaly detection model.

9. The method of claim 1, wherein determining whether to generate the alert based on the outputs of the multiple anomaly detection models includes performing a logical operation on the outputs.

10. The method of claim 1, wherein determining whether to generate the alert based on the outputs of the multiple anomaly detection models includes processing the outputs at an alert aggregation model.

11. The method of claim 1, wherein determining whether to generate the alert based on the outputs of the multiple anomaly detection models includes processing the outputs at a classifier.

12. The method of claim 1, further comprising sending a control signal to the device based on the outputs of the multiple anomaly detection models.

13. The method of claim 1, further comprising scheduling a maintenance action for the device based on the outputs of the multiple anomaly detection models.

14. The method of claim 1, wherein the first residual corresponds to a first output of a first autoencoder, and wherein processing the first data at the second anomaly detection model includes generating a second residual of a second autoencoder.

15. A computing device comprising:
one or more processors configured to:
obtain first data based on first sensor data from a first sensor device coupled to a device;
process the first data at a first anomaly detection model of multiple anomaly detection models trained to detect anomalous behavior of the device, wherein processing the first data at the first anomaly detection model includes determining a first residual of the corresponding residuals, the first residual determined based on an input of the first anomaly detection model and an output of the first anomaly detection model;
process the first data at a second anomaly detection model of the multiple anomaly detection models;
determine, at each anomaly detection model of the multiple anomaly detection models, a corresponding residual for that anomaly detection model, wherein the corresponding residuals include the first residual; and
determine, based on outputs of the multiple anomaly detection models, whether to generate an alert identifying that a particular output of at least one of the multiple anomaly detection models is abnormal, wherein the outputs include each of the corresponding residuals.

16. The computing device of claim 15, wherein the first anomaly detection model is trained to monitor a first aspect of operation of the device and the second anomaly detection model is trained to monitor a second aspect of operation of the device, wherein the first aspect of operation of the device is different from the second aspect of operation of the device.

17. The computing device of claim 16, wherein the first anomaly detection model is configured to monitor behavior of a first component of the device, and the second anomaly detection model is configured to monitor behavior of a second component of the device.

18. The computing device of claim 16, wherein the first anomaly detection model is configured to monitor a first physical system of the device, and the second anomaly detection model is configured to monitor a second physical system of the device.

19. A computer-readable storage device storing instructions that when executed by one or more processors, cause the one or more processors to:
obtain first data based on first sensor data from a first sensor device coupled to a device;
process the first data at a first anomaly detection model of multiple anomaly detection models trained to detect anomalous behavior of the device, wherein processing the first data at the first anomaly detection model includes determining a first residual of the corresponding residuals, the first residual determined based on an input of the first anomaly detection model and an output of the first anomaly detection model;
process the first data at a second anomaly detection model of the multiple anomaly detection models;
determine, at each anomaly detection model of the multiple anomaly detection models, a corresponding residual for that anomaly detection model, wherein the corresponding residuals include the first residual; and
determine, based on outputs of the multiple anomaly detection models, whether to generate an alert identifying that a particular output of at least one of the multiple anomaly detection models is abnormal, wherein the outputs include each of the corresponding residuals.

20. The computer-readable storage device of claim 19, wherein the first data is included in input data corresponding to sensor data from multiple sensor devices coupled to the device, and wherein the instructions are executable to further cause the one or more processors to:
process, at the first anomaly detection model, a first portion of the input data that includes the first data; and
process, at the second anomaly detection model, a second portion of the input data that includes the first data and that is distinct from the first portion.

* * * * *